United States Patent [19]
Morlock

[11] Patent Number: 5,773,779
[45] Date of Patent: Jun. 30, 1998

[54] METHOD AND SYSTEM FOR WELDING RAILROAD RAILS

[75] Inventor: Michael J. Morlock, Cleveland Heights, Ohio

[73] Assignee: The Lincoln Electric Company, Cleveland, Ohio

[21] Appl. No.: 950,408

[22] Filed: Oct. 15, 1997

Related U.S. Application Data

[63] Continuation-in-part of Ser. No. 802,935, Feb. 21, 1997.

[51] Int. Cl.$^6$ ..................................................... B23K 9/09
[52] U.S. Cl. ................ 219/54; 219/125.12; 219/137 PS; 238/164
[58] Field of Search ................................. 219/54, 137 R, 219/137 PS, 125.12, 74, 125.1, 73; 238/164

[56] References Cited

U.S. PATENT DOCUMENTS

| | | |
|---|---|---|
| 3,192,356 | 6/1965 | Shrubsall . |
| 3,308,266 | 3/1967 | Adams . |
| 4,429,207 | 1/1984 | Devletian et al. . |
| 4,672,173 | 6/1987 | Nomura et al. ....................... 219/125.1 |
| 4,686,341 | 8/1987 | Nomura et al. ............................ 219/54 |
| 4,841,116 | 6/1989 | Kimura et al. ............................ 219/73 |
| 5,175,405 | 12/1992 | Karimine et al. . |
| 5,605,283 | 2/1997 | Lahnsteiner et al. . |

*Primary Examiner*—Clifford C. Shaw
*Attorney, Agent, or Firm*—Vickers, Daniels & Young

[57] ABSTRACT

Methods are disclosed for gas shielded arc welding steel railroad rails spaced from each other to define a transverse gap, one of which methods comprises the steps of providing an elongated steel barrier plate wedged into the gap at the bottom of the spaced rails and filling gap above said steel barrier plate with a molten steel from an advancing filler metal electrode by a gas shielded electric arc welding process initiated by an arc between the electrode and the barrier plate. A second method comprises the continuous sequential laying of weld beads in the gap between rail heads along paths extending in laterally opposite directions for the beads to have first ends extending outwardly of an edge of the head in cantilever relationship thereto and which first ends are vertically thicker than second ends of the beads which are spaced from the first ends in the direction toward the opposite edge of the head.

55 Claims, 13 Drawing Sheets

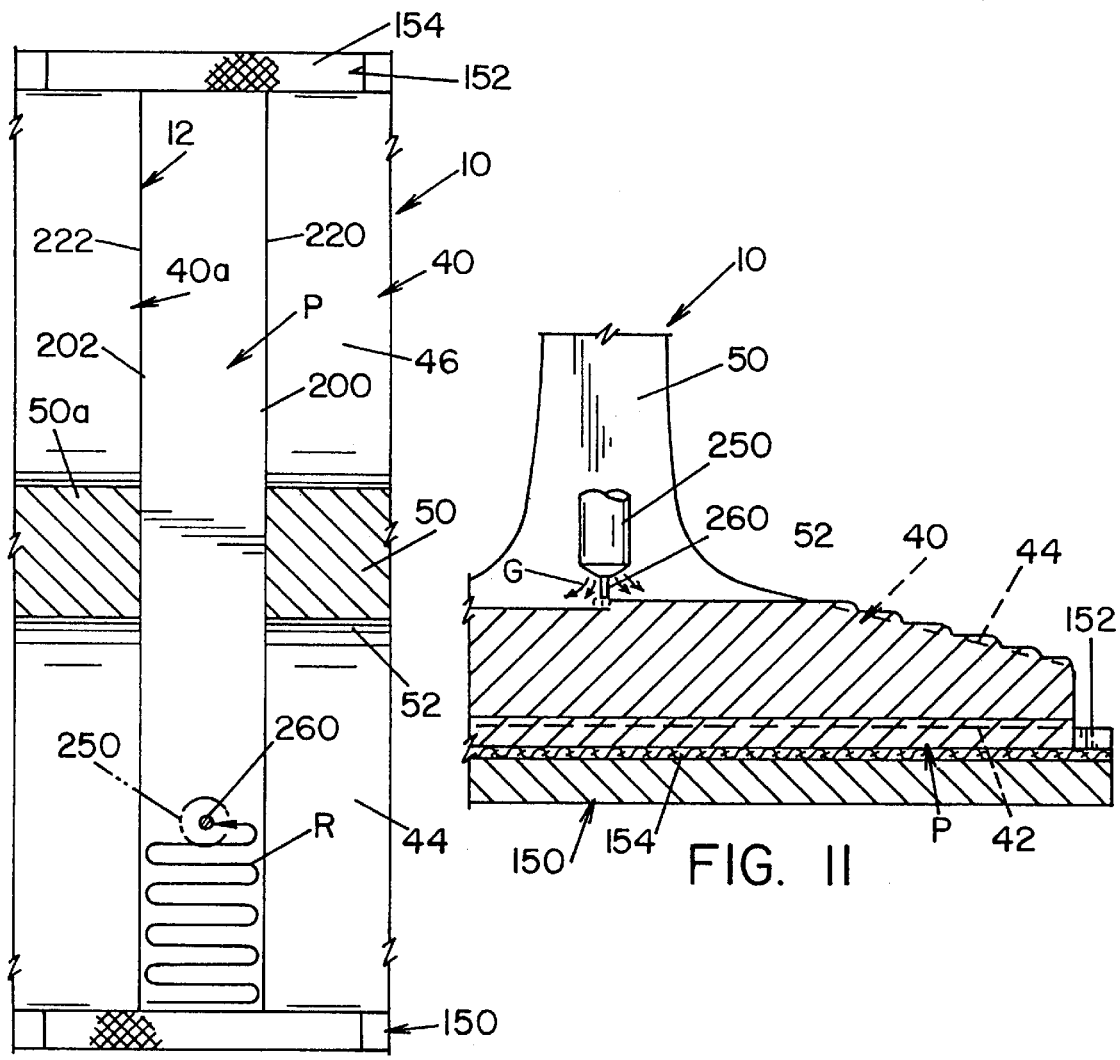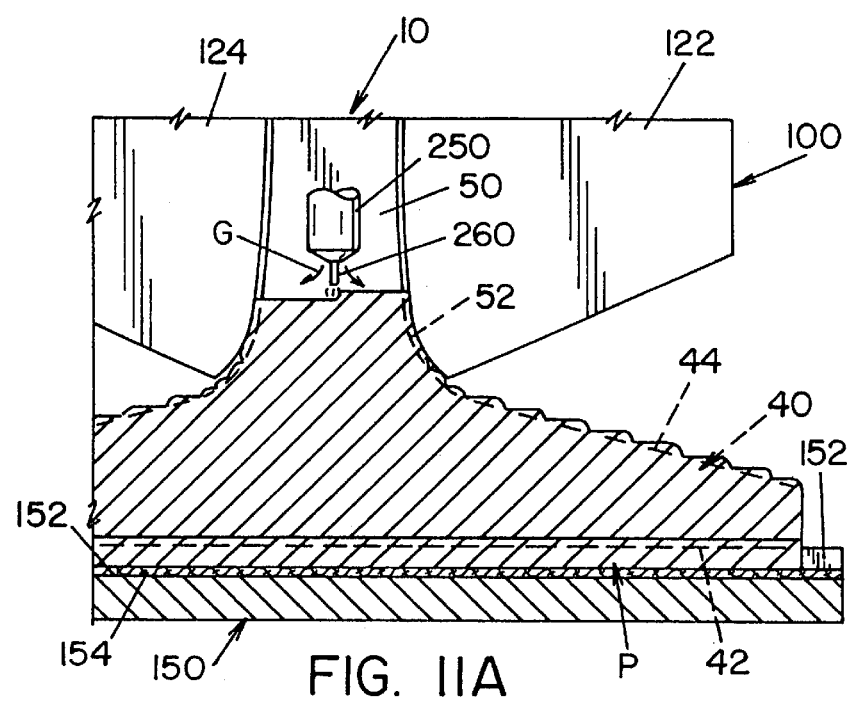

METHOD AND SYSTEM FOR WELDING RAILROAD RAILS

This application is a continuation-in-part of application Ser. No. 802,935 filed Feb. 21, 1997.

The present invention relates to a method and system for welding the spaced ends of rails and more particularly welding two spaced railroad rails in the field by an arc welding process.

Incorporation by Reference

Through the years, a tremendous amount of effort have been devoted to joining spaced railroad rails by some type of butt welding process. Such efforts have generally proven costly and unsuccessful, due to limitations of the processes used, the required time for accomplishing the welding process, the cost of performing the welding process and/or the inability to obtain successful, long-lasting joints. In Shrubsall U.S. Pat. No. 3,192,356 a submerged arc welding process is disclosed as an improvement over the deficiencies in prior gas pressure and electric flash welding techniques, and in Adams U.S. Pat. No. 3,308,266 and Devletian U.S. Pat. No. 4,429,207, the most common electric arc welding process is illustrated wherein the electroslag welding procedure is used to fill the gaps between spaced railroad rails in the field. This process involves filling the gap between the rails with a pool of molten metal covered by an appropriate slag. To prevent the mass of molten metal from flowing from the gap between the rails, side molds and a bottom member are provided that create a large protrusion of metal below the rails and extending from the actual gap. These prior patents illustrate a modified electroslag welding (ESW) technique which can be used in the field, where the rails cannot be turned upside down for normal welding. The advantages of electroslag welding over the normal thermite technique normally-used today are explained. In these disclosures, prior rail welding techniques, including the thermite process, are revealed to have substantial deficiencies, which are known to result in numerous failures in the field. These patents are incorporated by reference herein to describe the electroslag welding process even though the process has been abandoned as a practical process because of its obvious inefficiencies and inability to obtain uniform and successful welds in the field. Indeed, this process must deal with large masses of molten metal which presents problems in the field.

As an alleged advantage over the electroslag process, the combination of the electroslag technique and the gas shielded arc welding technique is disclosed in Karimine U.S. Pat. No. 5,175,405. This patent employs an automatic welding process for butt welding the spaced ends of railroad rails using a gas shielded arc welding process in combination with an electroslag process. The deficiencies of the normally-used thermite welding technique and the previously attempted enclosed arc welding technique are discussed in detail. As indicated, the thermite technique produces joints which have an unacceptably high failure rate; however, because of the economics, the time and inability to obtain an arc welding process of success, this thermite process is still the process of choice in the field. A disadvantage of the continuous arc welding technique discussed, as in this patent, is the inability to start the arc and the need for starting and stopping the arc as the welding process is performed. To overcome some of these disadvantages, this patent discussed the use of a submerged arc process at the bottom portion of the gap between the rails to start positively the welding process for subsequent and continuous arc welding. Karimine U.S. Pat. No. 5,175,405 is incorporated by reference herein to disclose the deficiencies of the thermite process, the enclosed arc welding technique and the submerged arc technique, all of which have been attempted and have not been successful in the field. The solution suggested by Karimine U.S. Pat. No. 5,175,405 is the use of a gas shielded arc welding technique in combination with an electroslag welding process wherein the gas shielded arc welding technique is used at the base of the gap to overcome the disadvantages of the previous attempts to use total electroslag welding. However, this process of using a gas shielded arc at the bottom of a gap could not be successful in the field due to the fact that there is no technique that will ensure accurate starting and depositing the first layer of the filler metal at the bottom of the gap.

In Lahnsteiner, et al. U.S. Pat. No. 5,605,283, railroad rails are disclosed as being welded together by a multiplicity of beads extending transverse to the longitudinal direction of the rails. The beads ascend from the base of the rails to the heads thereof in transversely parallel and longitudinally overlapping relationship and are laid using an inert gas shielded arc welding process. Three zones of the rails, namely the base, web and head, are distinctly and sequentially welded together, and the process enables the use of different filler materials in the different welding zones. The welding process necessitates delays between the sequential zone welding steps and is therefore undesirably time consuming and expensive.

The patents incorporated by reference illustrate the deficiencies of the prior art to which the present invention is directed wherein a combination of various types of arc welding processes have been attempted without success. Consequently, the admittedly deficient thermite process is the only process used extensively for providing molten metal between the spaced rails for joining such rails in the field.

BACKGROUND OF THE INVENTION

Railroad rails must be installed and repaired by joining ends of the rails while they are in use or assembled for use in the field. The joining process results in a joint between the rails which has a high strength, can be adjusted metallurgically, will not crack and can be economically formed in a very short time. As a criteria for such welding process, the process must be performed in substantially less than 45 minutes or such process will cause a delay or rerouting of train traffic. Two processes are now used for joining the rails in the field. The first process is the thermite technique wherein the spaced rails are surrounded by an appropriate sand mold and steel is melted and poured into the mold to fill the gap between the spaced rails. As the molten metal solidifies, the rails are joined; however, this process, which is universally used, has a failure rate that has been reported to be as high as 75%. In addition, the rails must be melted by the molten steel poured into the gaps between the rails. This melting requirement is not consistently met and also contributes to the failure of the joints produced in the field by the thermite process. To drastically decrease the deficiencies of the universally used thermite process, wherein steel is cast into the gaps between the rails, the ends of the rails may be joined by a flash butt welding process where the ends of the rails are driven together by tremendously high forces while electricity is passed between the rails. This causes the ends of the rails to become molten and pressure welded together. This process drastically reduces the failure rate of the joint to less than 10%. However, the flash butt welding process is best performed on rails in a manufacturing facility where the rails are not fixed on ties and can be forced together by stationary hydraulic equipment. To overcome the disadvantage of the universally used thermite process, the flash butt welding process has been modified for use in the field. However, the time for the welding process is substantially higher than the thermite process, since the rails must be stretched during the hydraulic forcing step, which step requires disconnecting one or both of the rails from the ties. This manual procedure must be reversed after the welding process has occurred, which is extremely time consuming.

Flash butt welding of rails consumes a portion of the rails which causes difficulties after the welding process has been completed. Also, sections of rails may have to be spliced into the rail to provide the necessary rail material for the weld.

In addition, it is deficient to transport the hydraulic equipment needed to create the tremendous pressure between the rails to remote locations as required in the field. The butt welding process also produces a flash around the periphery of the joined rails which must be sheared off and then ground to allow a smooth operation and also to prevent stress concentrations in the joint during use. Even though the flash butt welding process drastically reduces the rate of failure of the joints made in the field, the thermite process is still used because it can be done rapidly by merely putting a mold around the gap between the spaced rails. The process does not require large hydraulic equipment and is relatively inexpensive. The failure rate is addressed by again performing the thermite process when a joint has failed. In doing this, a large section of the rail must be cut and a new section of rail is inserted in the open area. Consequently, a failed thermite joint normally results in the need for two replacement thermite joints, with their propensity for failure. As can be seen, even though the thermite process is universally used, there is a substantial need for some process which will join the rails in the field, which process has a low failure rate, but has the advantages associated with the thermite process. This need has existed for many years. Arc welding processes have been tried periodically, such as electroslag, continuous arc welding and submerged arc welding and combinations thereof. None of these processes has been successful because they use impractically large equipment, take an unacceptably long time to weld and finish grind, and have not resulted in acceptable failure rates. The arc welding process, especially in the lower part of the gap between the rails, has been inconsistent. In addition, these prior attempts to use arc welding for joining the ends of spaced railroad rails were expensive, required complex equipment and demanded a substantial time to prepare for the welding process and actually performing the welding process. Such time is not available in field welding of rails.

The Present Invention

The present invention relates to a method and system for using gas shielded arc welding to join the spaced ends of railroad rails in the field, which method and system result in an economical, rapid and mechanically and metallurgically sound technique.

Railroad rails have a somewhat standard cross-sectional shape involving a lower base with a support bottom, which bottom is relatively wide to allow the rail to be placed in a stable position on spaced ties. Above the base is a vertically extending web that merges into an upper wheel-engaging head. This head is often hardened to provide better wear resistance as the wheels of the train roll over the rails. Hardness in the head area is especially important in curved track sections since there is a slipping action between the wheels and the rails due to the solid axle construction between transversely spaced railroad wheels. In addition, the rails must have a smooth head to prevent vibration of cars passing over the rails. This need to reduce vibration has caused a substantial increase in the desire to actually butt weld the rails in high speed, high weight rail systems. In the distant past, the rails were not welded together, which created the characteristic vibration of trains passing over the rails. With the advent of the high speed, high weight and high tech railway systems, the rails must be joined together as a continuous rail which has increased the demand for joining processes performed in the field to which the present invention is an improvement. The invention overcomes the disadvantages of the thermite technique and the flash butt weld technique.

In accordance with the present invention, the ends of rails to be joined are spaced from each other to define a gap having a lower opening. This gap has a width for the purposes of gas shielded arc welding by providing filler metal and gun in the gap. In accordance with the invention, an elongated steel barrier plate with a length generally corresponding to the width of the rails at the base and a width greater than the width of the gap, is wedged between the rails at the bottom of the gap. Thus, in the lower portions of the base areas of the gap, this steel barrier plate is driven to span between the spaced rails. This wedging action causes a contact between the barrier plate and the two rails, both of which are grounded. After wedging the barrier plate into position at the bottom of the gap between the rails, the gap is filled with molten metal by the gas shielded electric arc welding process which is initiated by bringing a welding gun downwardly until the electrode filler metal contacts the barrier plate. The plate has a thickness of generally one-eight inch and in the range of 0.050 to 0.300 inches. Since this lower barrier plate is tightly wedged between the rails at the bottom of the gap, the welding process is started by bringing the filler metal electrode into contact with the barrier plate. The welding, thus, takes place on the top of the relatively substantial fixed barrier plate in accordance with standard gas welding technique. In the lower portion, the gas welding technique is a constant voltage spray arc welding. This process allows for high heat and penetration at the lower layer of weld metal. The electrode is a high strength, low alloy metal-cored electrode, wherein the core material provides the needed alloy metals. The metal cored electrode is shielded with an appropriate shielding gas. In practice, the metal-cored electrode is a MC 1100 Outershield electrode with a gas shielding of 95% Argon and 5% of Carbon Dioxide or Oxygen. The core metal of the electrode is selected to match the metal forming the spaced rails to give the necessary yield strength. The gas shielding is provided around the advancing metal-cored electrode in accordance with standard practice in either the spray mode or a subsequently used pulsed mode of arc welding. In this process, very little slag is created, which was a problem with the submerged arc and electroslag processes. Such slag created in those processes can result in inclusions in the metal, especially at the interface between the molten metal and the ends of the rails. These inclusions cause failures.

The present invention utilizes a gas shielded arc welding process in either the pulsed mode or a constant voltage spray mode, with the spray mode being used at the bottom of the gap adjacent the novel barrier plate wedged between the spaced rails. The invention uses a high performance digitally controlled power supply with a complex, high speed waveform control. In practice, a Lincoln Electric Powerwave 450 power supply is provided which has the capability of switching immediately between constant voltage spray welding and then an appropriately control pulsed welding process. In each instance, the welding process of the present invention is a gas shielded electric arc welding process which produces the high heat necessary to provide a sound metal interface between the ends of the rails and the weld metal produced by the metal-cored electrode as it advances towards the pool of molten metal in accordance with standard welding practice. Before performing this operation, the rails are preheated to a temperature of about 900° F. The first layer of weld metal is laid while consuming the barrier plate wedged between the rails by moving the electrode across the gap while it is moving transversely along the gap. The root pass is applied by the spray welding process, as are the next several layers to allow high penetration and a high heat in the large area at the base of the rails. Thereafter, the power supply is switched to a pulsed weld process. Additional passes are made to fill in the area between the rails at the lower base of the rails. After the first or second passes, the wedged barrier plate is no longer a factor since the molten metal above the plate is solidified. When the welding process approaches the web portion of the rails, contoured copper shoes are used to enclose the gap so that the gap now provides an enclosed cavity. In accordance with one aspect of the invention, the cavity is filled by continuing the shielded gas welding process, which process is converted back to the constant voltage spray mode to penetrate effectively. This arc welding process continues beyond the web to the head of the rails. In practice, in accordance with this aspect, the pulsed mode of operation is employed to provide transition areas between the spray mode of constant voltage welding, which process is used at the major part of both the head and web and at the starting part of the lower base. It has been found that good results can be obtained by switching between a spray mode and a pulsed mode of operation. The pulse arc mode of welding is used for heat input control during certain portions of the total welding process.

As so far described, a gas shielded electric arc welding process fills the gap between the spaced rails, which process is made possible by the use of a lower barrier plate actually wedged between the two rails at the bottom of the gap between the rails. This barrier plate is formed of steel and has a thickness of between 0.050 to 0.300 inches. The lateral edges of the plate are chamfered to produce about a 0.030 inch vertical contact ledge. In this manner, the wedging action can deform the edges of the barrier plate to ensure positive electrical contact between the rails and the barrier plate. In practice, the original width of the barrier plate is greater than the width of the gap between the rails to ensure a tight wedging action as the barrier plate is forced into a wedged position at the bottom of the gap. The width of the plate is in the range of 0.010 to 0.025 inches greater than the width of the gap. This causes a distortion of the plate as it is wedged into position and assures a fixed position and electrical contact, which contact is essential to an efficient subsequent arc welding process. In the past, no such starting mechanism was provided for an electric arc welding process used to join the spaced ends of railroad rails.

In accordance with another aspect of the present invention, the novel method and system includes a heat insulation element, or ceramic layer, below the barrier plate and overlapping the lower opening of the gap to prevent the arc from penetrating through to the copper whereby the arc could melt a portion of the copper which could cause copper induced cracking problems. The copper support block is located under the rails for preventing loss of the molten metal in the gap and is a heat sink to prevent over heating of the weld deposit.

In accordance with yet another aspect of the invention, improved strength of the weld in the gap between the heads of the rails is achieved by a unique procedure for laying beads of weld metal in the gap between the transition areas between the heads and webs of the rails and in the gaps between the central and crown areas of the rails. This process lays beads of filler metal in a manner which provides for weld reinforcement at the laterally opposite edges of the transition and central portions of the heads so as to optimize protection against vertical separation of the head from the web during subsequent use of the rails and the high forces which are imposed thereon by locomotives and railway cars moving thereacross and which forces cause sinuous distortions in the rails and through the welded joint therebetween. Preferably in accordance with this aspect of the invention, the gap between the lower portion of the bases of the rails is filled in the manner referred to hereinabove through the use of a barrier plate and the constant voltage spray welding process followed by a completion of the filling of the gap between the upper portions of the bases and the webs and heads of the rails using the pulsed welding process. When the welding of the rail webs is completed up to the transition portions of the heads, beads of filler metal are continuously laid sequentially in laterally opposite directions between the laterally outer edges of the transition central and crown portions of the head with movement of the welding electrode delayed at the beginning of the laying of each bead in a manner which produces successive beads extending in opposite directions relative to one another. Each bead has an end at one of the outer edges which is vertically thicker than the remainder of the bead and which is in cantilever relationship with respect to the edge and thus provides underlying support for the vertically successive bead having its beginning and ending ends extending in the same direction relative to the laterally opposite edges of the transition, central and crown portions of the heads. The gaps between the transition, central and crown portions of the heads are filled by continuously translating the welding electrode back and forth between the laterally opposite sides of the head in the foregoing manner until the filling operation is complete.

The primary object of the present invention is a provision of a method and system for gas shielded arc welding of steel railroad rails, which method and system can be performed rapidly in the field and have a low failure rate.

Yet another object of the present invention is a provision of a method and system, as defined above, which method and system employs the concept of wedging a metal barrier plate in the bottom of the gap between the spaced rails to start and control the lower portion of the gas shielded arc welding process used in the method and system of the invention.

Still another object of the invention is a provision of a barrier plate to be wedged between spaced railroad rails at the bottom of the gaps between the rails for the purposes of allowing an efficient and rapid joining of the rails by a gas shielded arc welding process.

A further object of the invention is a provision of a method for joining steel railroad rails in a manner which optimizes the strength of the weld in the gap between the heads of the rails.

Another object is the provision of a method of the foregoing character which provides weld reinforcement at the laterally opposite edges of the rail heads to optimize protection against vertical separation of the heads of the rails from the webs thereof.

These and other objects and advantages will become apparent from the following description taken together with the accompanying drawings.

BRIEF DESCRIPTION OF THE DRAWINGS

FIG. 10 is a top view showing the gap between the space rails with the root pass or first layer being processed;

FIGS. 11 and 11A are enlarged, partially cross-sectional views showing the progress of the welding process in the gaps adjacent the base of the rails and then starting in the web area of the rails;

THE PREFERRED EMBODIMENT

Figure 1:
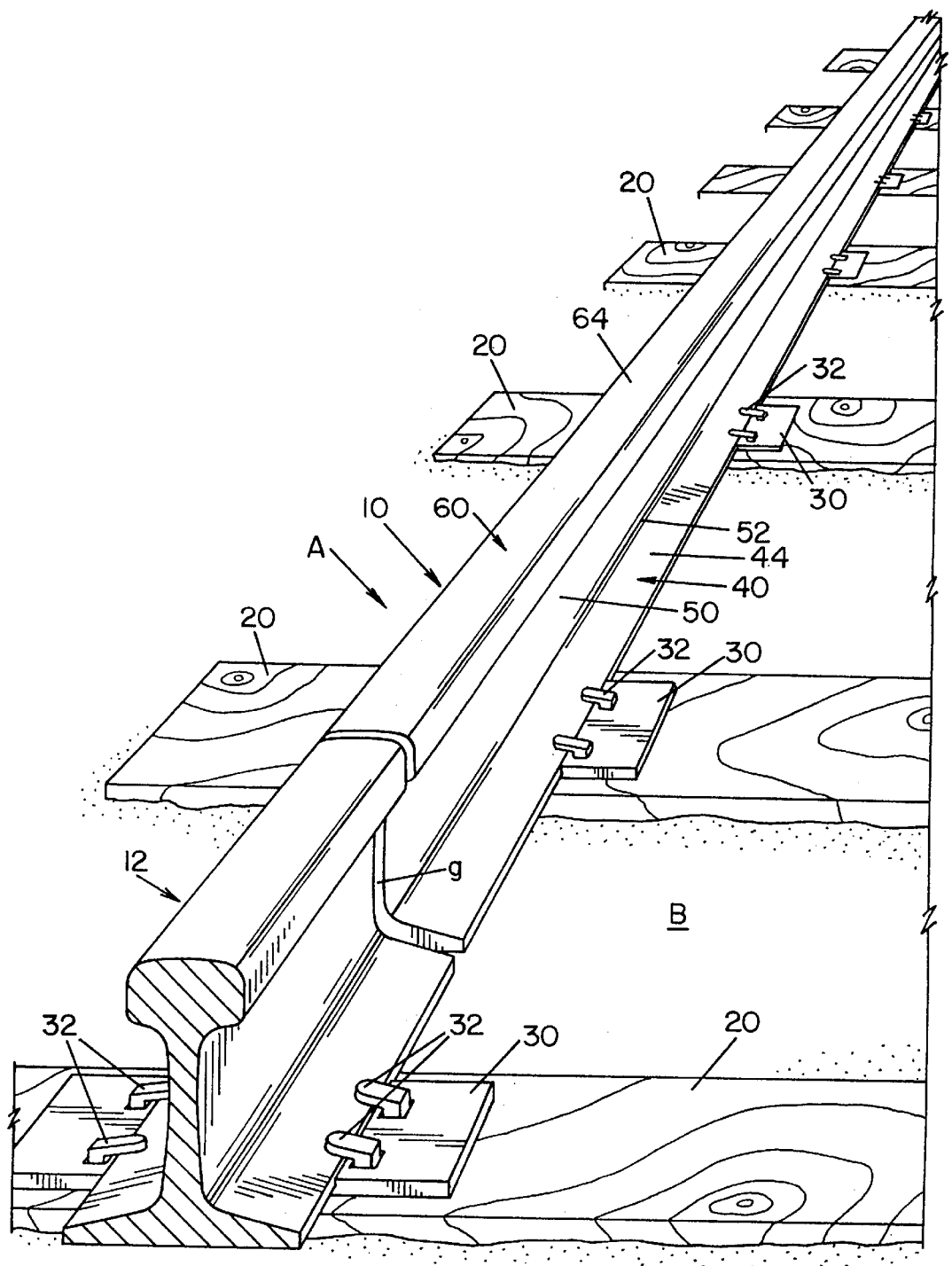
FIG. 1 is a pictorial view of a railroad with rails spaced to define a gap ready for joining in the field.
Figure 2:
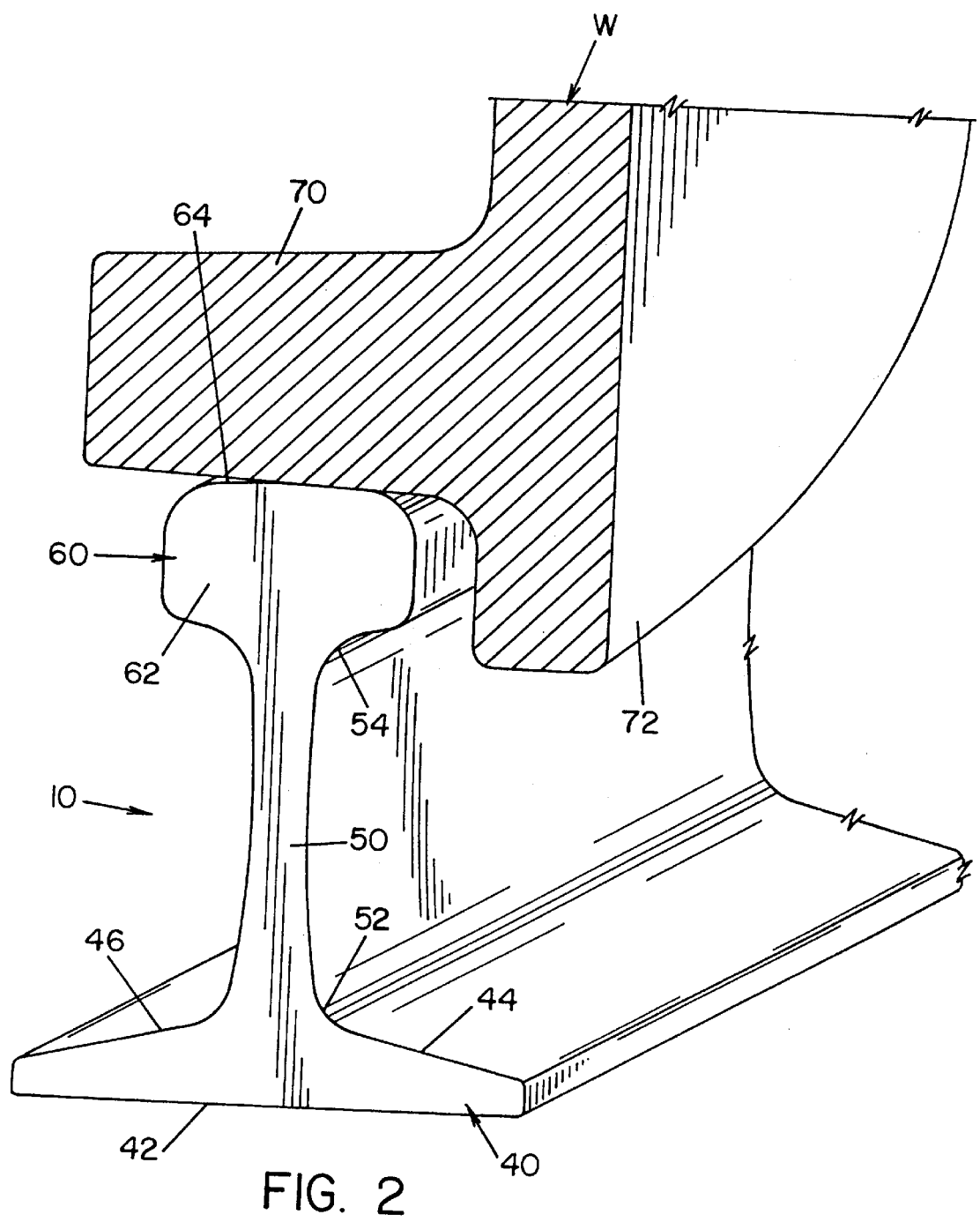
FIG. 2 is a cross-sectional view of the end of the rail with a part of the wheel shown for the purposes of illustrating the need for hardness at the head of the joint between the rails.

Referring now to the figures wherein the drawings are for the purpose of illustrating the preferred embodiment of the invention only and not for the purpose of limiting same, FIG. 1 shows a railroad rail A laid on right-of-way bed B and including rails 10, 12 to be joined to form a continuous welded rail (CWR) and supported on bed B by ties 20, steel support caps 30 and spikes 32. Rails 10, 12 are spaced to define a gap g which is to be filled by molten metal to join the two rails 10, 12 together as a continuous rail in the field, as opposed to a plant assembly of continuous rail. Gap g can be the gap between two sections of rail to be repaired or the gap between two sections of rail which are to be initially installed as a continuous welded rail system. If the gap g is used for repairing, it is sometimes necessary to cut the rails and insert a long rail section. This process is used for repairing rails which have fractures, joints which have fractured or joints which are defective. In all instances, the two spaced rails 10, 12 are separated by a gap g which is generally 1.00 inches. The pictorial representation in FIG. 2 shows rail 10 which has a standard profile or cross-section including a lower base 40 which is quite wide and includes a support bottom 42 for stabilizing the rail on ties 20 to support the weight of trains passing along the rails. Base 40 has two upwardly angled top portions 44, 46 that merge into a vertically extending web 50 having a lower fillet 52 and an upper fillet 54. The upper fillet merges into head 60 having a large body portion 62 and an upper wheel support surface 64, known as the rail crown, which surface area receives a rolling wheel W having a cylindrical rim 70 and a disc 72 that prevents the wheel from moving to the left on the head 60 as the wheel rolls along the rail. In view of the contact of the wheel with the side or body portion 62, and the continuous high weight contact of rim 70 with upper surface 64, head 60 has a normal hardness of Brinell 300 with a range of −60 to +40 on the Brinell Scale. Since the head is hardened, the metal forming the rail, at least in the head portion, must be a fairly high alloy steel. The alloy steel used in the filler metal to fill gap g has hardness along the upper portion of the rail in the area of gap g that meets the rail welding specification in accordance with the present invention.

Figure 3:
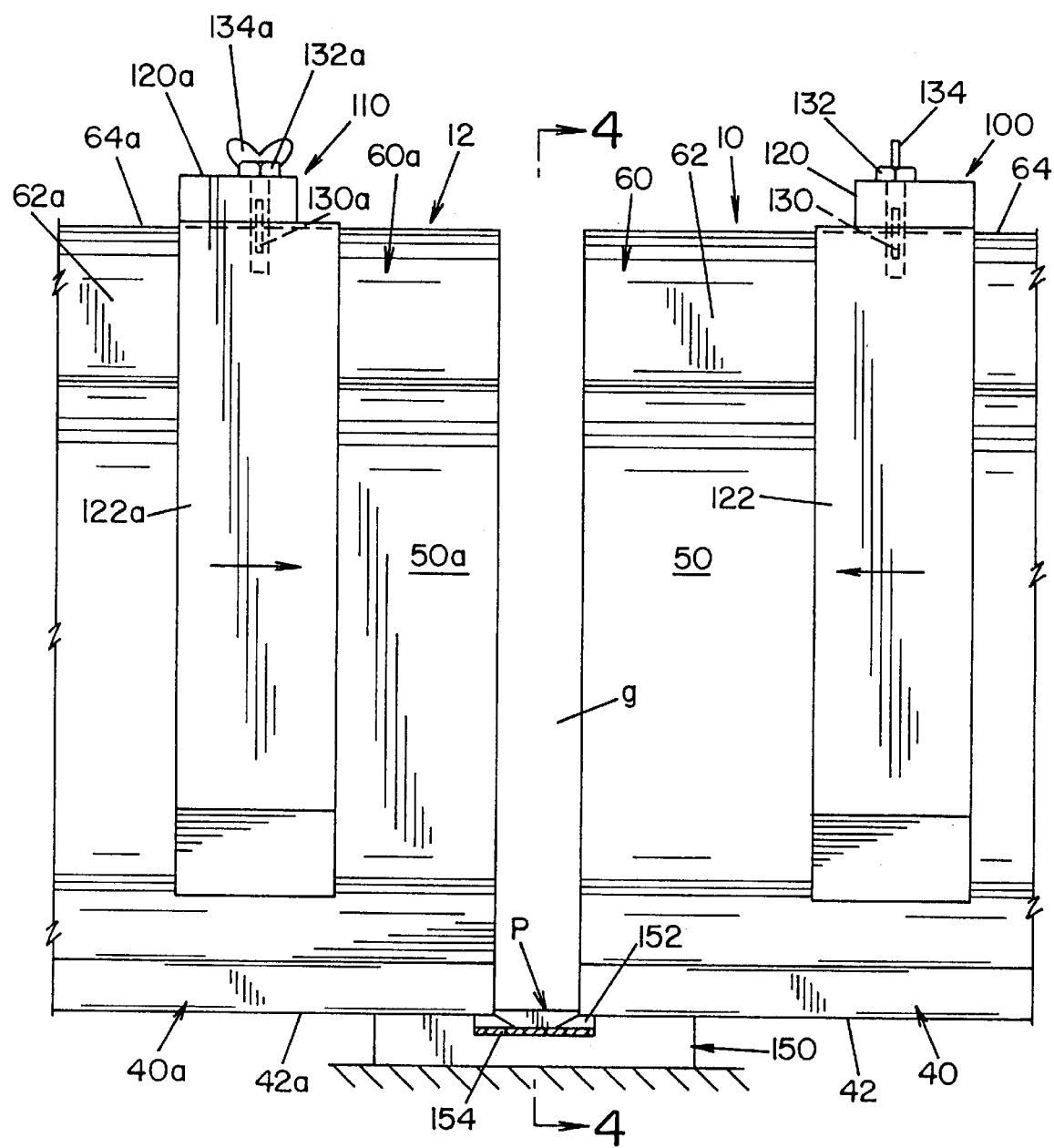
FIG. 3 is a side elevational view showing the spaced rails being conditioned for the start of the method and system of the present invention.
Figure 4:
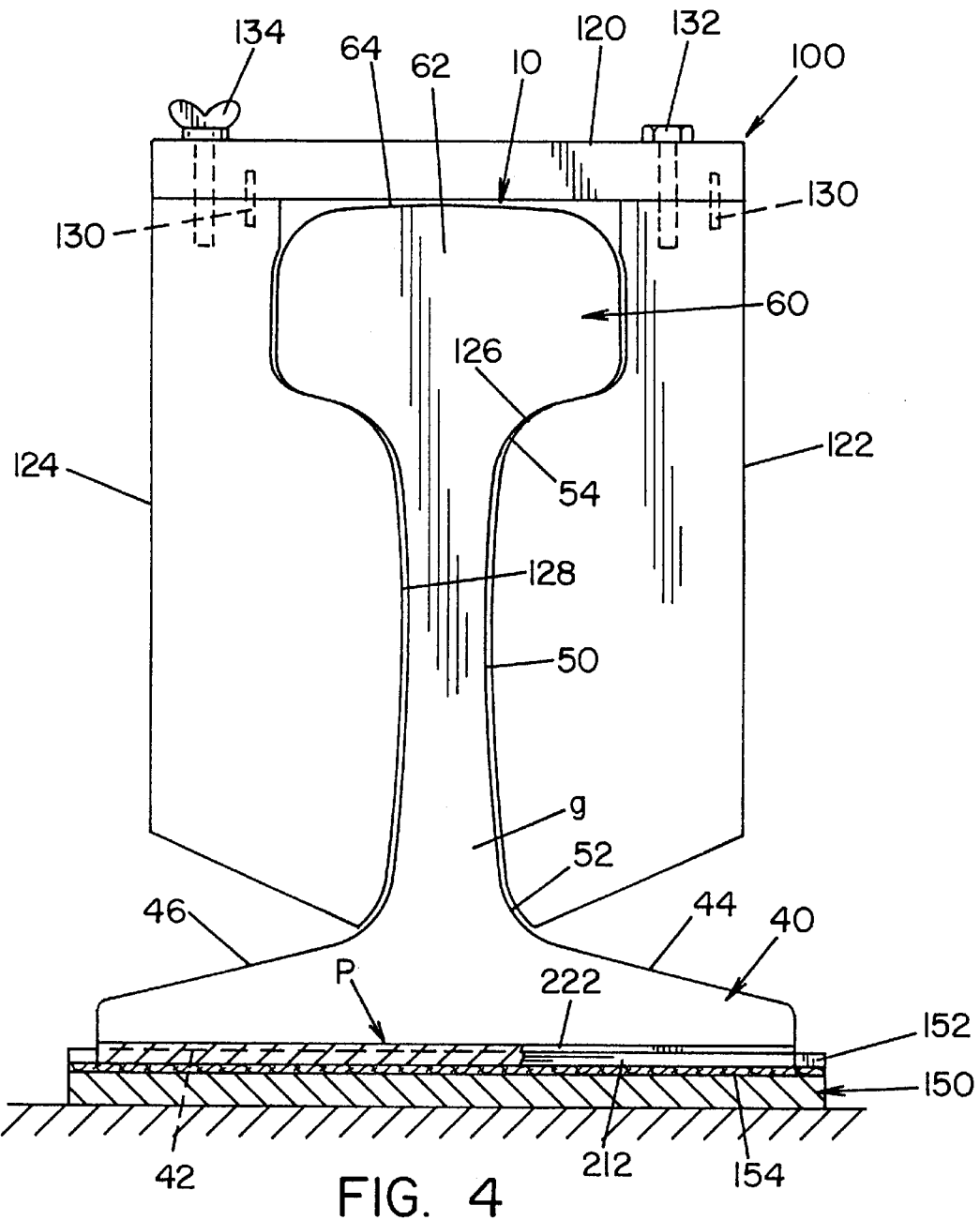
FIG. 4 is a cross-sectional view taken generally along line 4—4 of FIG. 3.
Figure 5:
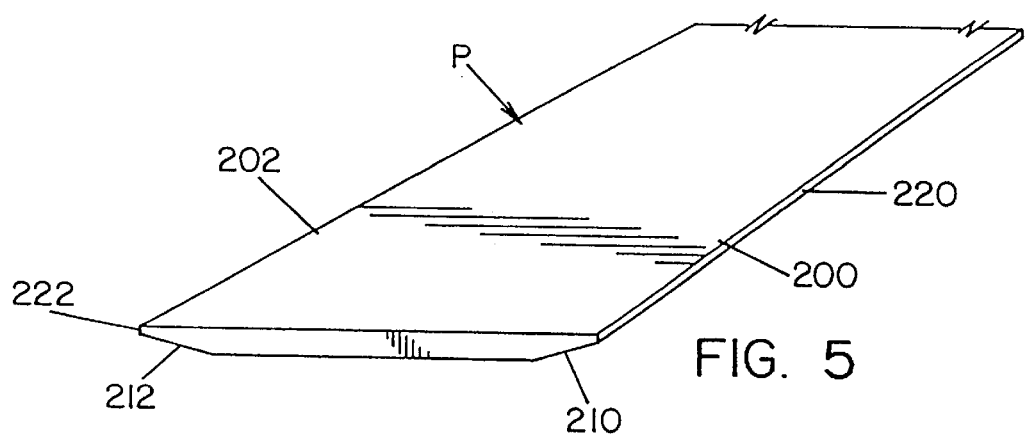
FIG. 5 is a pictorial view of the novel barrier plate constructed in accordance with the present invention.
Figure 6:
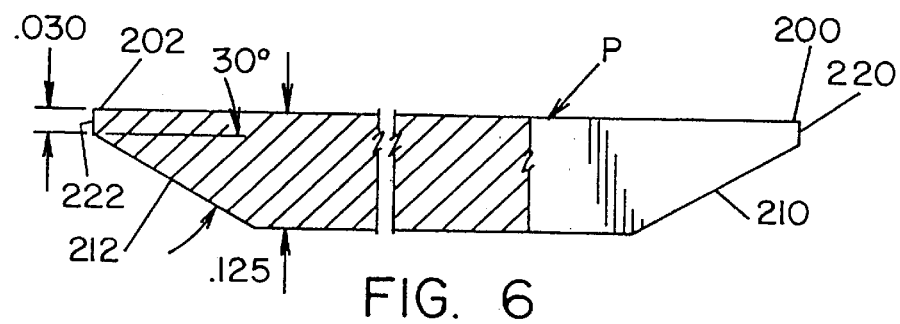
FIG. 6 is a partially cross-sectional view of the barrier plate shown in FIG. 5.
Figure 7:
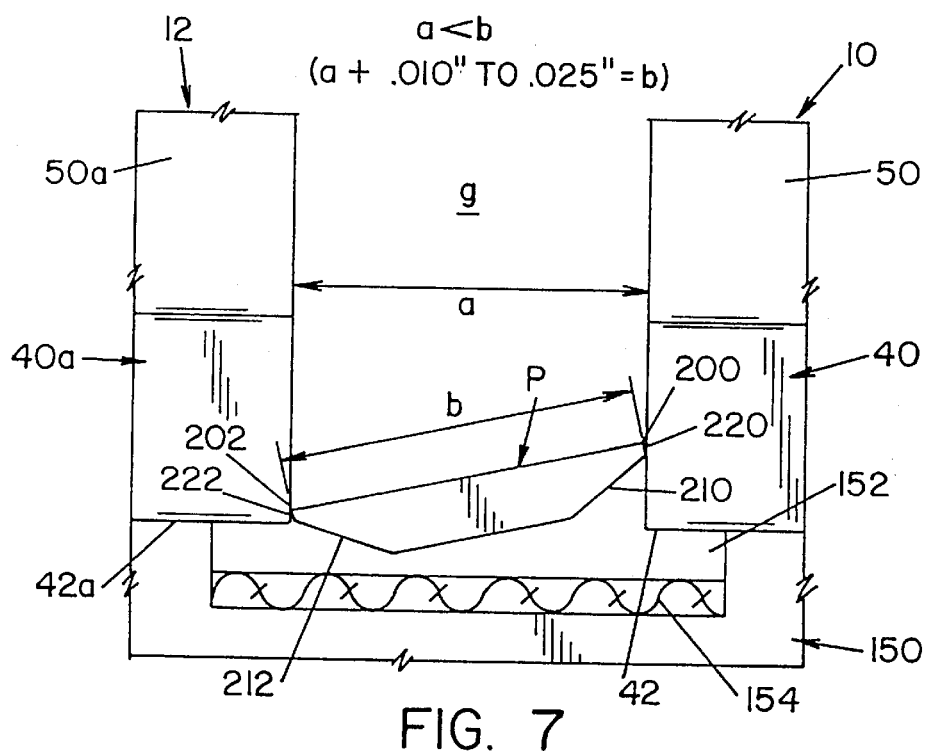
FIG. 7 is a schematic view illustrating characteristics of the novel barrier plate shown in FIGS. 5 and 6 as it is being wedged into position between the rails.

In FIG. 3, the elements on rail 12 corresponding to elements on rail 10 are indicated by the suffix "a." This same designation will be used in explaining the copper shoes 100, 110 wherein shoe 100 is draped over rail 10 and shoe 110 is draped over rail 12. Shoe 100 will be described in detail and the same description applies to shoe 110, wherein the corresponding elements on shoe 110 corresponding to the elements on shoe 100 will be designated with "a." In FIG. 4, shoe 100 includes a top support bar 120 allowing hanging shoes 122, 124 formed of heavy copper blocks to be slidable along the head of a rail. The top support bar 120 also provides alignment of shoes 122, 124 and maintains spacing of shoe 122 from shoe 124 as well as the gap between the shoes and the rail sections. Facing inwardly toward the rail cross-section are contour faces 126, 128, respectively. These faces match the contour of rail 10 so that sliding of shoes 100, 110 together at gap g closes the gap to produce a cavity having a cross-sectional shape of the rails 10, 12. To stabilize the hanging shoes, alignment pins 130 are provided together with bolts 132, 134 to allow assembly of the heavy copper shoes 122, 124 from support bar 120. In operation, the shoes are moved to the position shown in FIG. 3 to open gap g and allow welding at the lower base portion of the rails. Thereafter, shoes 100, 110 are moved together to close the gap to allow welding in the vertically extending web portions 50, 50a of rails 10, 12, respectively. As will be explained later, a lower block 150 formed of copper, or high copper content alloy, is positioned under the bottom 42 of rail bases 40, 40a. An upper transversely extending recess 152 is dimensioned to accommodate an insulation element in the form of a ceramic layer 154 which spans the bottom portion of gap g under the rails as shown in FIG. 3. To close the bottom of gap g, there is a novel elongated barrier plate P best shown in FIGS. 5, 6 and 7.

Figure 8:
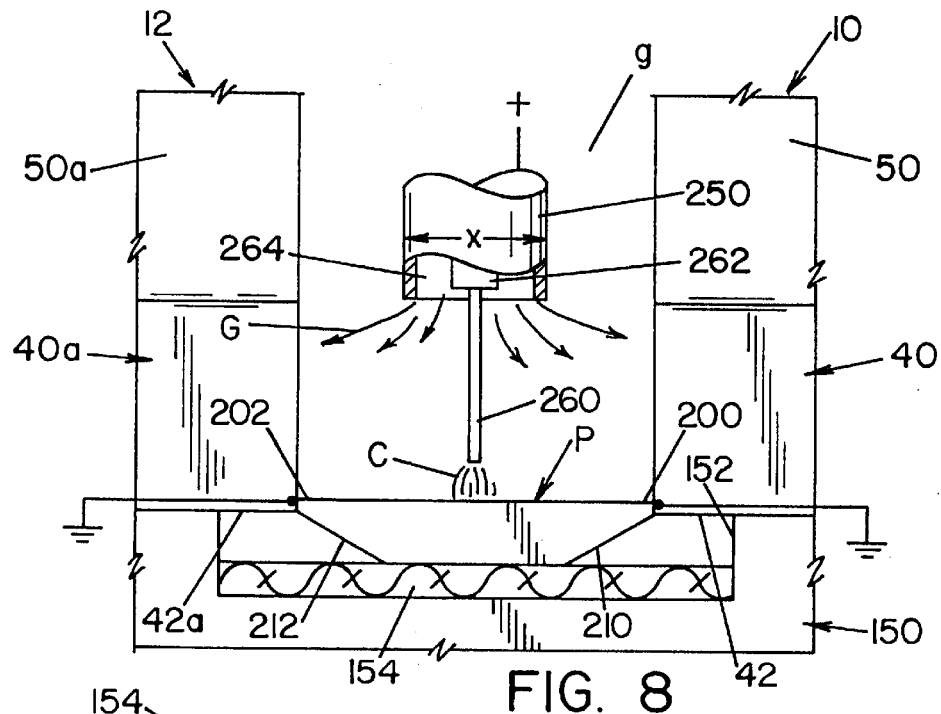
FIG. 8 is a view similar to FIG. 7 showing the arc welding gun and electrode at the start of the arc welding process.

In the past, electric arc welding in gap g was attempted, but was not successful because the processes were not consistent in operation and did not have a support structure for laying the first or second layers of filler metal in gap g. This gap is approximately 1.00 inch to accommodate a downwardly extending gun carrying an electrode and a gas nozzle such as shown in FIG. 8. In the past, since the gap has to be fairly wide to accommodate the welding equipment, there was not a uniform and consistent filling of the gap, especially at the bottom portion where it was critical because of the support function of the rails. The rails flex and are stressed drastically at base 40. To solve these problems, the present invention involves the use of plate P shown in FIGS. 5–7. This plate is formed of low carbon steel, since the alloying in the gap is accomplished by the metal powder in the core of the electrode used in the arc welding process. This plate has a thickness in the range of 0.050 to 0.300 inches. In practice, the plate has a thickness of 0.125 with a width between parallel edges 200, 202 being designated as dimension b in FIG. 7. This dimension, in its original condition, is slightly greater than the width a of gap g. Consequently, plate P must be forced, such as by a hammer, to be wedged between rails 10, 12 at the lowermost portion of the rails, as shown in FIG. 3. This wedging action causes the plate to be swaged to a slightly smaller final width. This wedging action which swages one or more of the edges 200, 202 of plate P assures electrical contact between plate P and rails 10, 12, which rails are grounded. When in position, plate P rests on the top of insulating element 154 located in recess 152 of lower support copper block 150. Block 150 provides a lower barrier for molten metal being deposited in gap g between rails 10, 12 during the arc welding process to be explained later. Shown in FIGS. 5 and 6, parallel edges 200, 202 include 30° chamfers 210, 212, respectively which are initiated at about 0.030 inches below the top surface of plate P to define flat ledges or walls 220, 222, respectively. These walls are swaged against the facing surfaces of rails 10, 12 at the bottom of gap g to form the bottom of a gap to initiate the welding process. Plate P is forced and wedged into the position shown in FIG. 8 to a rigid, fixed position.

Referring now to FIG. 8, gas metal arc welding gun 250 has a diameter x, about ½ inch, and the gap g has a thickness of 1.00 inch allowing movement of gun 250 in gap g. Continuously issuing from gun 250 is a metal-cored electrode 260 supported in guide 262 which, in practice, is a high strength low alloy metal cored electrode, typically of the E110C-G type. The wire or electrode can be a Lincoln Electric electrode sold as Outershield MC 1100. As electrode 260 is advancing downward, arc C is created between plate P and electrode 260. This arc may be either used for spray or pulsed welding, as will be described later. A shielding gas G is propelled from passage 264 around electrode guide 262 in accordance with standard gas shielded arc welding technology. Wedging of plate P assures that the grounded rails are in intimate contact with barrier plate P. The upper surface of a plate is used to strike the arc and the plate itself supports the weld puddle during the first and/or second pass of electrode 260 in its progress along the upper surface of plate P fixed in gap g. This plate supports the arc during the starting operation. Insulation 154 prevents penetration of the arc to the copper support block 150. In this manner, block 150 provides a good heat sink, but does not allow copper migration into the weld. Copper contamination is prevented by plate P and the use of the lower ceramic layer 154. During the starting of the arc, the arc will not burn through the relatively thick plate P. As the arc moves back and forth between rail 10 and rail 12, the arc will move into the area of chamfers 210, 212 at which time the arc may penetrate through plate P along the edge 200, 202. However, molten weld metal from the metal-cored electrode may flow through this portion of the plate P against the lower insulation layer or ceramic layer 154 without causing any problems. Edges 200, 202 are chamfered to allow the wedging action that is necessary to create the tight electrical contact so that there is a superior grounding action at the plate during the arc welding process. The plate is wedged into the bottom of gap g. The shielding gas G surrounds arc C and the plate P maintains the lower barrier for the weld metal. In FIG. 10, it is illustrated that electrode 260 moves back and forth in a serpentine pattern as the electrode passes for the first time over plate P to lay the first or root pass R. The metal from this first pass is maintained on plate P and forms a molten metal pool joining the bottom portions of rails 10, 12.

The arc welding process is accomplished by using a digitally controlled inverter welding power source capable of complex high speed waveform control, such as the Lincoln Electric Powerwave 450 Power Supply. The root pass R is accomplished by a constant voltage spray welding process for high heat and high penetration in the root. As illustrated in FIG. 11, several layers are laid transversely across gap g in the lower portion of the gaps between bases 40, 40a of rails 10, 12, respectively. After several layers of metal have been deposited by the constant voltage process, the power supply is switched to a pulsed mode of operation and lays additional layers, as shown again in FIG. 11. This covers the base welding operation of gap g. Thereafter, as shown in FIG. 11A, shoes 100, 110 are moved to enclose the gap g at the web portion and head portion of rails 10, 12. As shown in FIG. 3, bars 120, 120a are offset transversely along the rails. This produces an upper opening between shoes 100, 110 to allow continued use of gun 150 in the welding process. This welding process can shift between constant voltage spray or the more rapid pulsed mode of operation. In both instances, the process is a gas shielded arc welding process to fill the gap with filler metal from electrode 260. The metal in the core is selected to properly alloy the filler metal in gap g to produce the desired strength and metallurgical characteristics of the weld joint.

Figure 13:
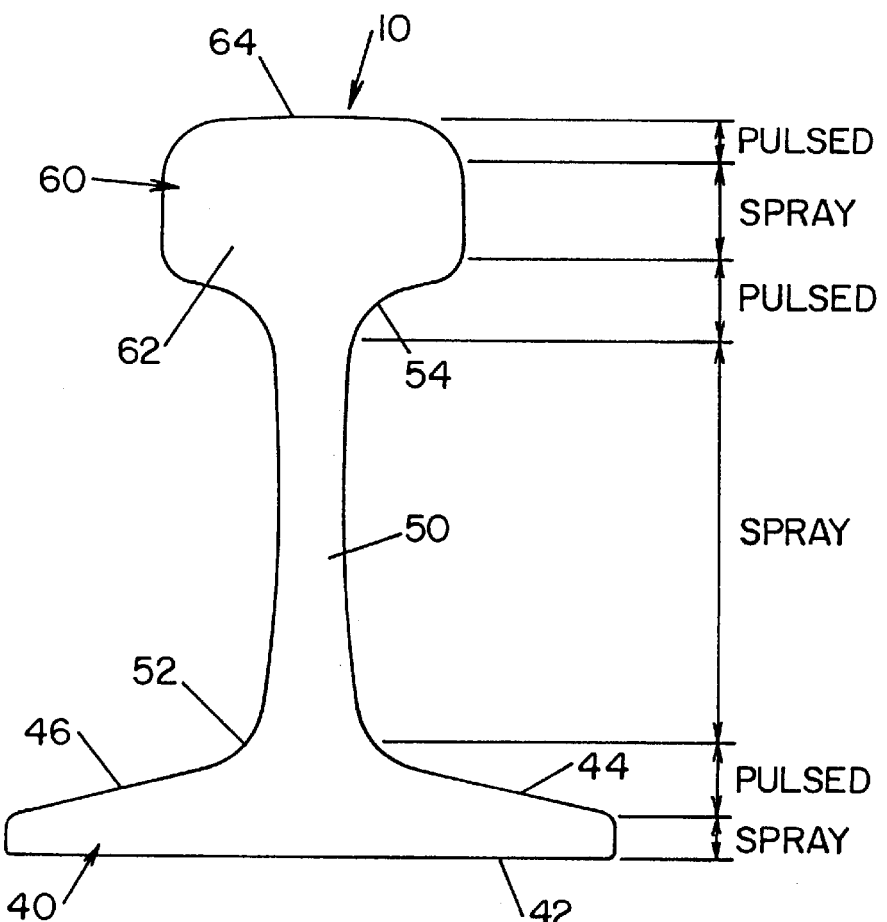
FIG. 13 is a side elevational view of the rail showing portions of the gap which are welded by constant voltage spray welding and by pulsed welding in one embodiment of the present invention.

The welding process, as used in practice, is schematically illustrated in FIG. 13. A pulsed mode of operation is used adjacent the angled top portions 44, 46 of bases 40, 40a. In a like manner, a pulsed mode of operation is used in the area of fillet 54 and at the top surface 64 of head 60. The spray mode of operation is used at the bottom for starting root pass of the process to assure proper initiation of the welding process and joining of the rails at the root in gap g.

Combinations of the spray mode and pulsed mode can be used or the spray mode can be used for the total process. The spray mode is used at novel plate P.

Figure 9:
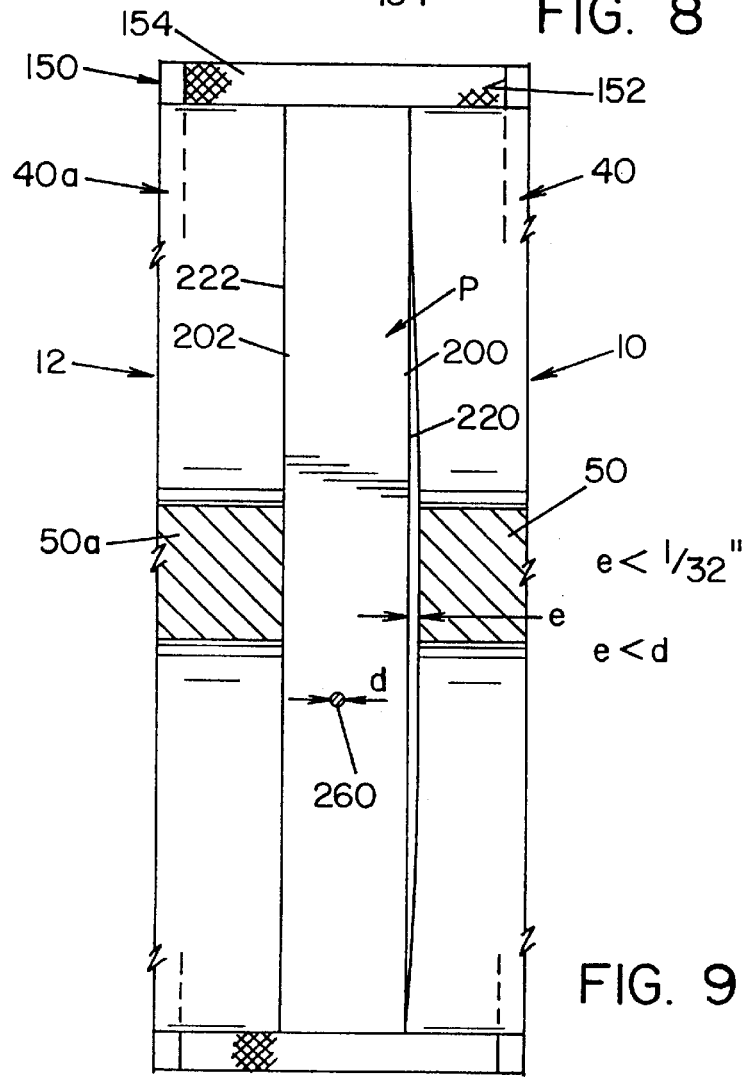
FIG. 9 is a top plan view of the gap between the space rails illustrating certain requirements for the metal barrier plate, shown in FIGS. 5 and 6.

Even though the facing surfaces of rails 10, 12 are flat, it is possible that there may a slight curvature in one or more of the surfaces. This concept is schematically illustrated in FIG. 9 wherein a gap e is created between plate P and the end surface of rail 10. The limitation of the present invention is that the diameter d of electrode 260, which in practice is approximately 1/16 inch, must be substantially more than gap e so that the arc created by electrode 260 will not merely pass downwardly through insulation barrier or element 154. Even with this slight variation, there is still proper contact between the rail or rails for the purposes of grounding plate P to assure intimate electrical continuity between plate P and the grounded rails. This illustration is only presented for the purposes of discussing the concept that the plate P provides a barrier between the arc C and the lower support structure below gap g.

Figure 12:
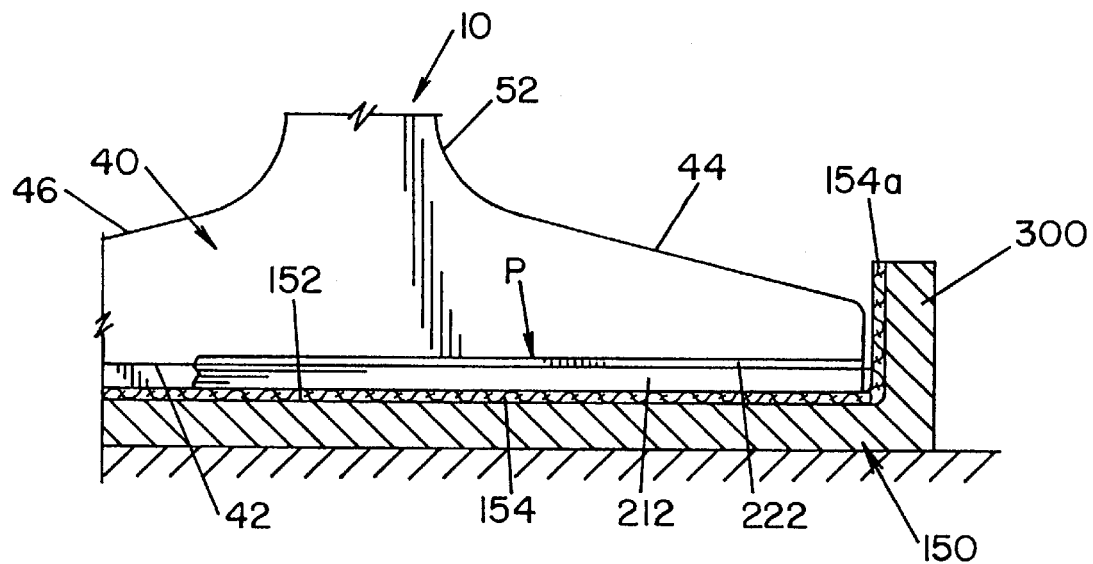
FIG. 12 is a partial cross-sectional end view showing a modification of the preferred embodiment of the barrier plate of the present invention.

A slight modification of the invention is illustrated in FIG. 12 wherein support 150 has end plate 300 extending upwardly adjacent the lateral portions of bases 40, 40a of the rails. Insulation cloth, or ceramic layer, 154 has an elongated portion 154a that moves upwardly along end plates 300 to provide an outermost dam or barrier for the molten filler metal deposited in lower portion of gap g before shoes 100, 110 are moved together for welding in the web area and head area of gap g.

The present invention has no slag in the filler metal deposited in gap g. It also employs a gas shield process which process can be converted between spray mode of operation and pulsed mode of operation by using a variety of power supplies available in the welding field. It has been found that this welding process produces a sound weld with failure rates that rival the failure rates of the flash butt weld technique. Barrier plate P is consumed; thus, it is part of the molten metal at the root portion of gap g. The alloy material does not need to be provided by plate P since the metal-cored electrode carries the alloying metals in its core.

Figure 14:
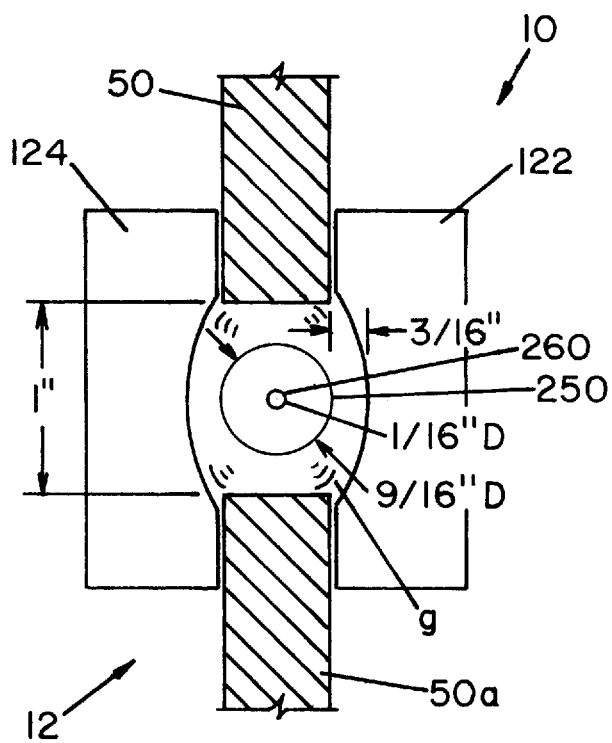
FIG. 14 is a somewhat schematic plan view, partially in section, illustrating the relationship between the welding gun, electrode, rail webs, and copper shoes in connection with the welding of railroad rails in accordance with another embodiment of the invention.
Figure 15:
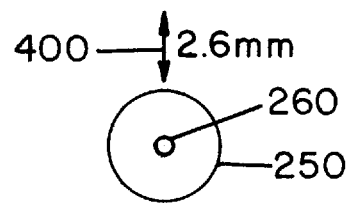
FIG. 15 is a schematic illustration of the welding gun and electrode shown in FIG. 14.
Figure 16:
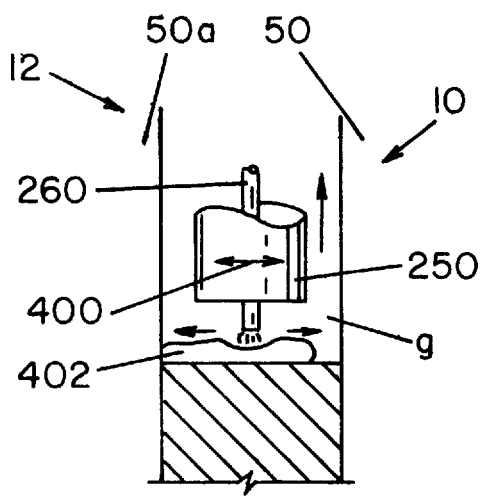
FIG. 16 is a somewhat schematic elevation view of the welding gun and electrode in the gap between the rails looking in the direction from right to left in FIG. 14.

FIGS. 14–23 illustrate aspects of another embodiment of the present invention in which the gap between railroad rails is filled with molten steel from a filler metal electrode by a gas shielded electric arc welding process including the filling of the gap between the head portions of the rails using a bead laying format which optimizes the strength of the weld in the gap between the head portions and provides weld reinforcement at the laterally opposite edges of the heads. In these Figures, like numerals are used to designate components which basically correspond to those described hereinabove in connection with FIGS. 1–13. FIGS. 14–16 somewhat schematically illustrate the spacial relationship between the welding gun 250, gap g and copper shoes 122 and 124 in the area of webs 50 and 50a of rails 10 and 12 during the course of the welding process to be described in detail hereinafter. As will be appreciated from these Figures, gun 250 and welding electrode 260 move laterally in groove g relative to the longitudinal direction of rails 10 and 12 and which lateral direction is the direction between shoes 122 and 124 in FIG. 14. At the same time, the welding gun and electrode are oscillated longitudinally of gap g as indicated by arrow 400 in FIGS. 15 and 16. In this embodiment, gap g is one inch, welding gun 250 has a diameter of 9/16 inch, and the welding gun has a total oscillating displacement of 2.6 mm and, thus, 1.3 mm in either direction from the center position shown in FIG. 14. As will be appreciated from FIG. 16, such oscillating movement of gun 250 and electrode 260 provides for longitudinally spreading the molten filler material 402 of electrode 260 between the longitudinally opposed faces of webs 50 and 50a providing gap g.

Figure 23:
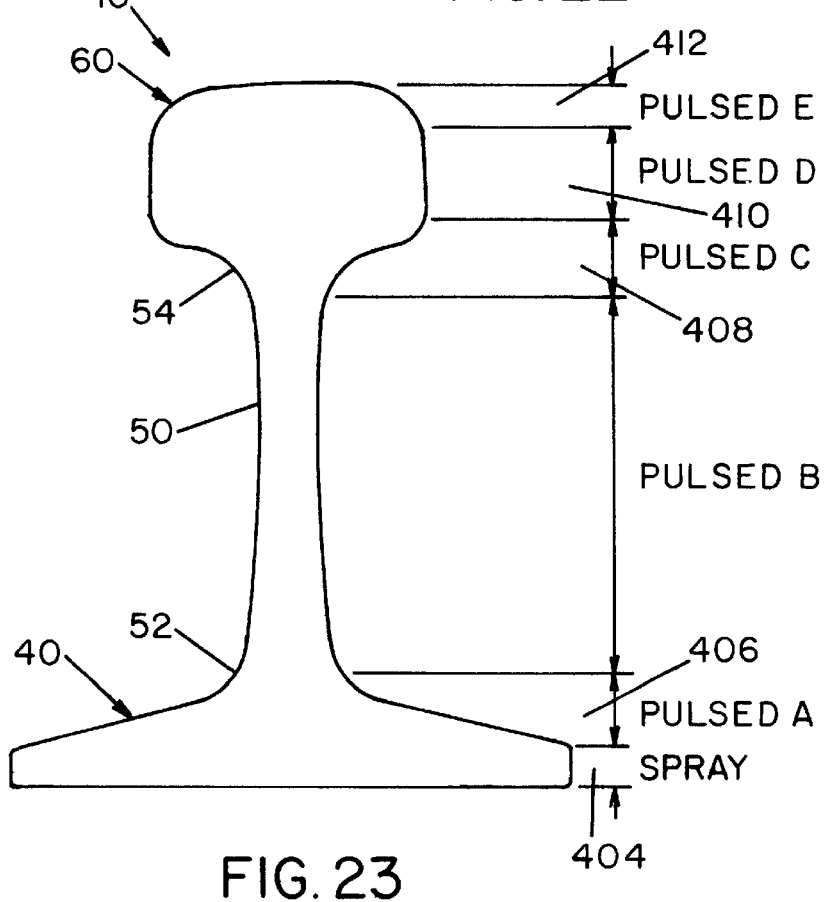

As will be appreciated from the depiction of rail 10 in FIG. 23, the bases of the rails are comprised of a bottom portion 404 and a top portion 406 with lower fillet area 52 providing a transition area between top portion 406 and web 50, and the head of each rail comprises a transition portion 408 at the upper end of web 50 and including fillet 54, a central portion 410 and a crown portion 412. Accordingly, it will be appreciated that gap g between the rails to be joined has portions corresponding to these base, web and head portions. As will be further appreciated from FIG. 23, spray welding is used only for the root or first pass in the gap between bottom portions 404 of the rail bases, such filling being achieved by moving the electrode laterally across the gap while oscillating the electrode longitudinally during the lateral movement. As mentioned hereinabove in connection with the embodiment of FIGS. 1–13, the spray welding process advantageously allows high penetration and high heat in the large area at the base of the rails. After the root or first pass, the welding power supply is switched to the pulsed weld mode and additional passes are made laterally with longitudinal oscillation of the electrode to fill the gap between the top portions 406 of the rails. As in the process described with regard to FIGS. 1–13, when the filling of the gap approaches the area of the webs of the rails, the contoured copper shoes are used to enclose the gap and, again as is apparent from FIG. 23, the gap between the webs is filled by continuing the shielded gas welding process in the pulsed mode.

Figure 17:
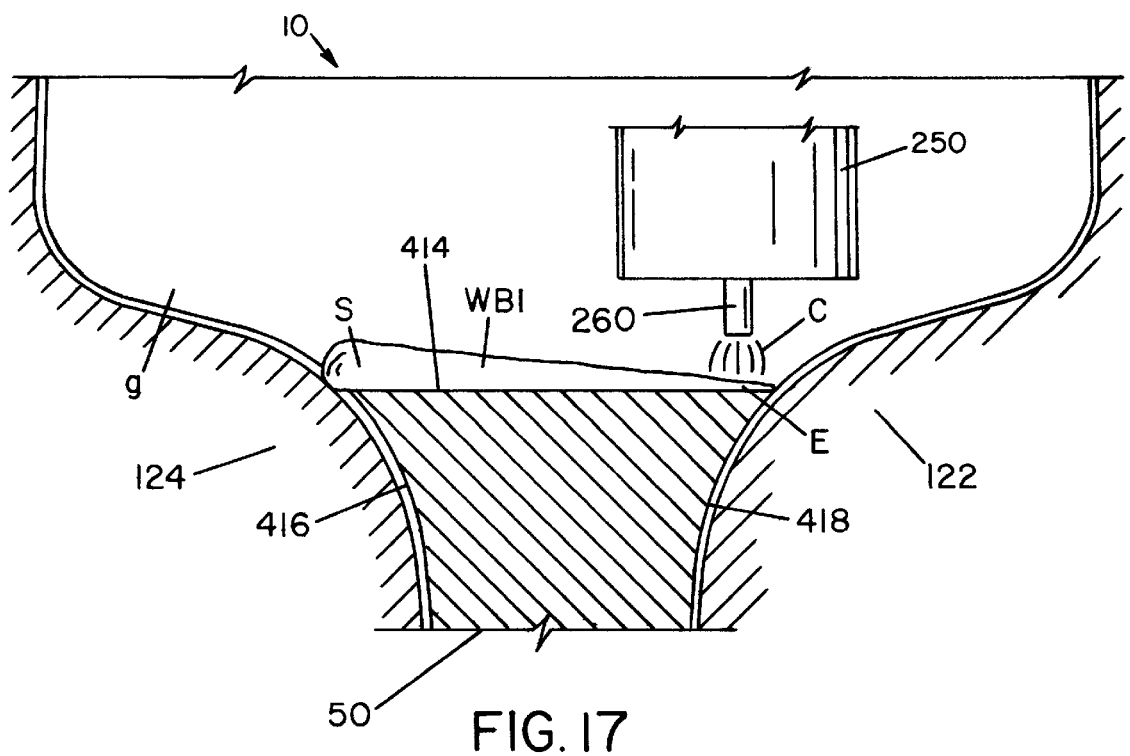
FIG. 17 is an enlarged cross-sectional elevation view through the gap between rails being welded and illustrating the laying of a bead of filler material in the gap between the transition portions in accordance with this embodiment of the present invention.
Figure 18:
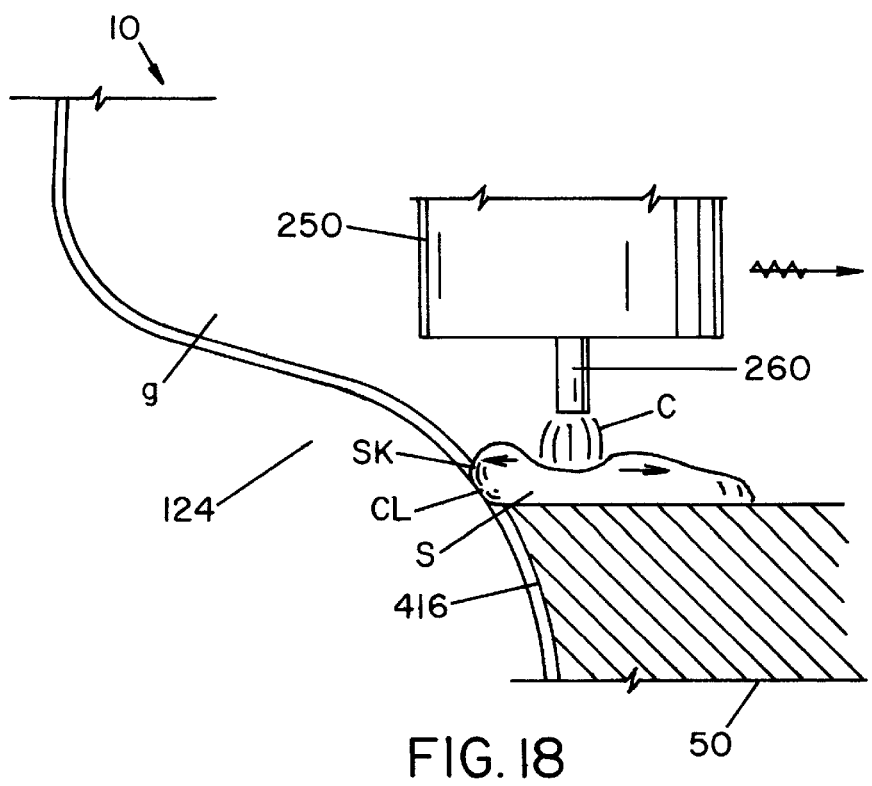
FIG. 18 is an enlarged detailed view illustrating the holding of the welding electrode at the starting end of a bead corresponding to the lefthand end of the bead shown in FIG. 17.
Figure 19:
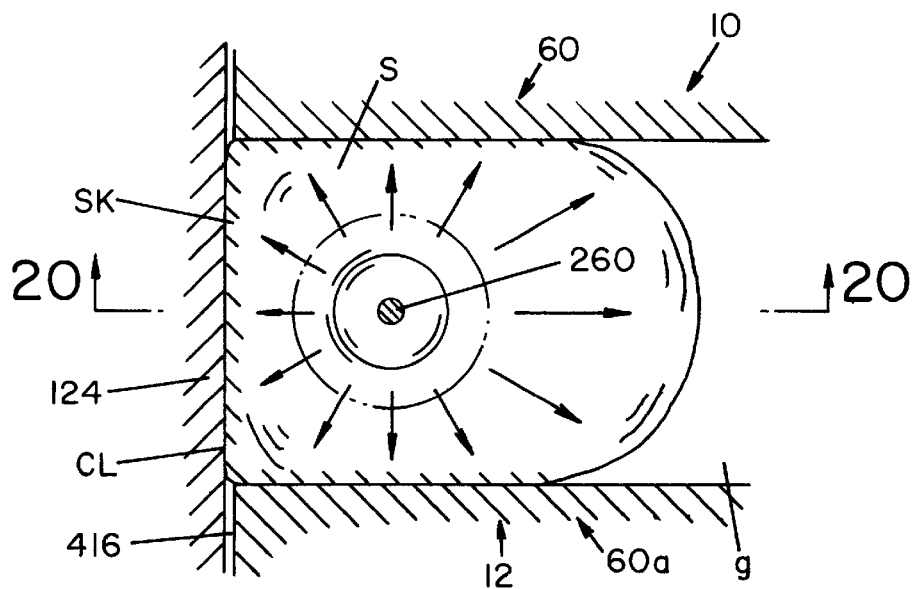
FIG. 19 is a plan view of the starting end of the bead shown in FIG. 18.
Figure 20:
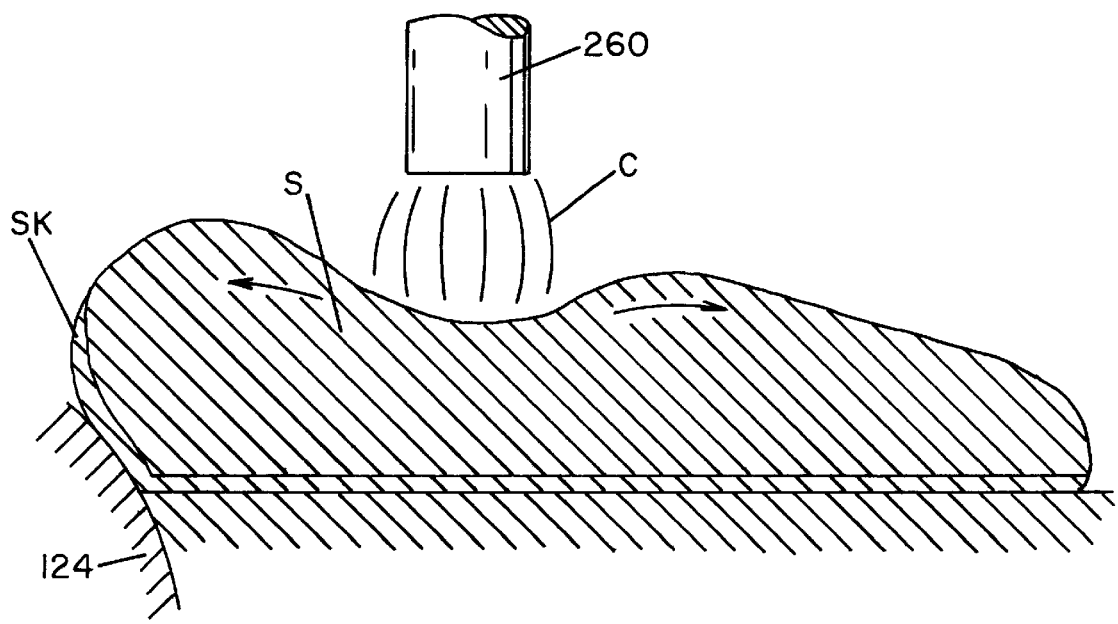
FIG. 20 is an enlarged sectional elevation view of the starting end of the bead taken along line 20—20 in FIG. 19.

In connection with the welding process as thus far described, the welding gun and electrode are traversed laterally of the gaps between the top portions of the rail bases and the rail webs at a uniform speed, whereby the successive layers of weld metal are substantially of uniform vertical thickness between the beginning and ending ends thereof. In accordance with the present embodiment, when the welding process reaches the upper end of the gap between the rail webs, and thus the lower end of the gap between the transition portions of the rail heads, welding in the pulsed mode continues, but the manner in which the beads are laid is modified. As will become apparent from the following description of FIGS. 17–21 the manner in which the beads are laid in the gap between the heads provides for each of the successively laid beads to have a beginning end which is vertically thicker than its ending end and disposed in cantilever relationship with the corresponding one of the laterally opposite edges of the head and, in the gap between the transition portions of the heads, with the beginning end of the underlying head. With reference first to FIG. 17, assuming numeral 414 to represent the upper surface of the last bead of filler material laid in the gap between the rail webs, the first welding bead WB1 laid in the gap between the transition portions of the rail heads is laid along a path extending laterally across the gap and having starting and ending ends respectively adjacent laterally opposite edges 416 and 418 of the gap. Bead WB1 has a first end S at the starting end of the path and a second end adjacent the ending end of the path. Further, bead WB1 is vertically thicker at first end S than at second end E thereof and, as shown in FIG. 18, has an outer end CL at the first end thereof which extends outwardly in cantilever fashion from the outer edge 416 of the gap. The manner in which the bead profile and cantilevered end are achieved will be appreciated from FIGS. 18–20 taken in conjunction with FIG. 17. In this respect, as shown in FIG. 18, welding gun 250 and electrode 260 are initially positioned adjacent edge 416 at the starting end of the path and are ultimately moved to the right in FIG. 18 toward edge 418 of the gap. In accordance with this embodiment, the welding gun and electrode are delayed or held at the starting end of the path for a predetermined period of time, whereby the force of arc C drives the molten weld metal laterally and longitudinally of the starting end to fill the gap thereat as shown in FIG. 19. While the weld metal is spread in the foregoing manner, it is important to note that there is no contact of the arc with the copper shoes and that the molten metal contacting shoe 124 as seen in FIGS. 17–20 forms a skin SK on the first end of the weld bead.

Figure 21:
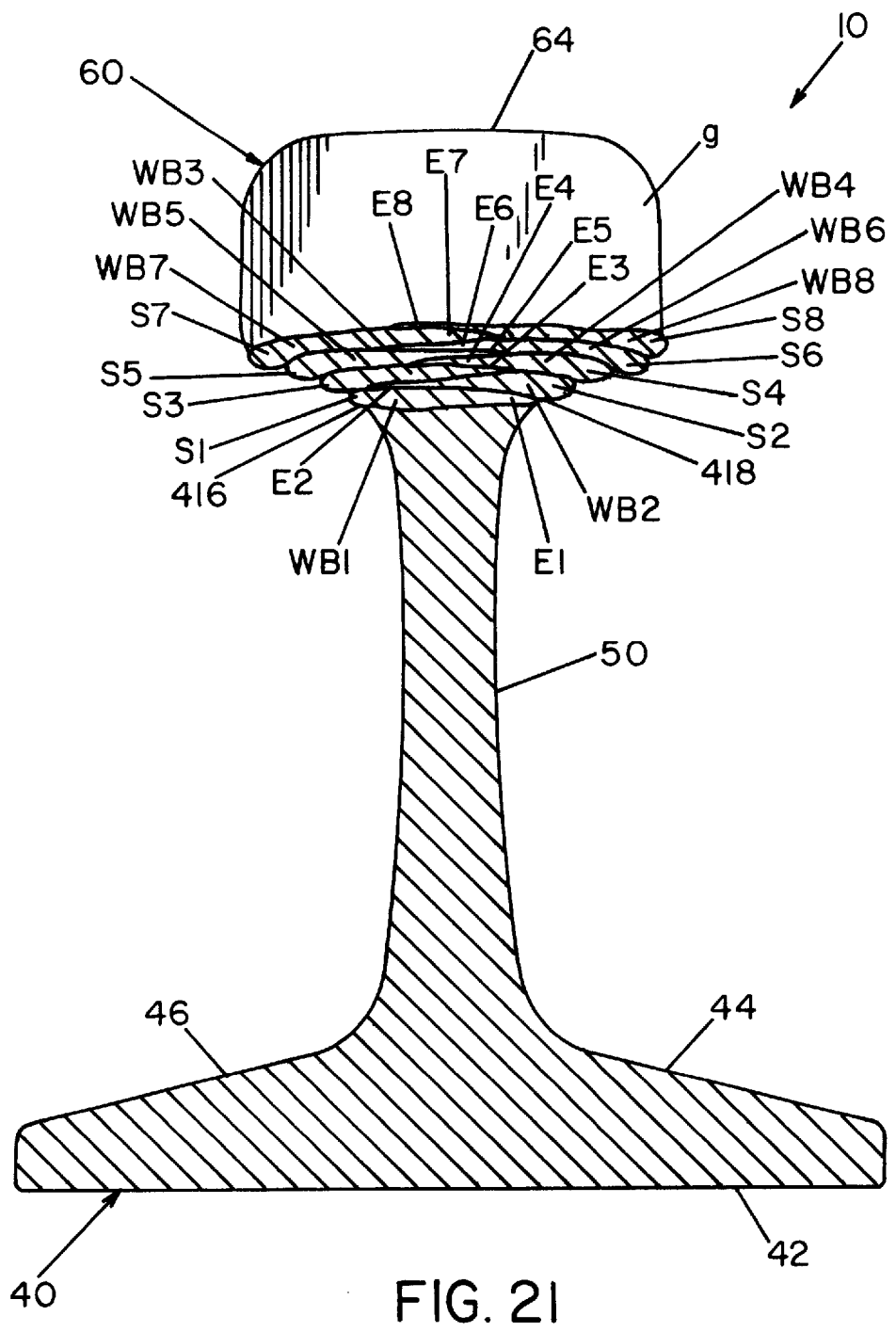
FIG. 21 is a cross-sectional elevation view through the gap between rails being welded and showing the gap between the transition portions of the rails to be filled by laying beads in accordance with this embodiment of the present invention.

After the predetermined hold time at the starting end of the path, the welding gun and electrode are moved from the starting position shown in FIG. 18 to the ending position shown in FIG. 17 and at a given rate of speed which, together with the delay at the starting end, provides for the welding bead profile to taper so as to be vertically thinner at the second end E thereof than at first end 52. As will be appreciated from FIG. 21 and the foregoing description, second end E1 for first weld bead WB1 defines the location for first end S of the next or second weld bead WB2. The gun, and thus the electrode, are oscillated longitudinally of the gap during movement from the starting position to the ending position and, upon reading the latter position, oscillation is stopped. Again, gun 250 and electrode 260 are delayed or held for a preselected period of time at the starting end of the path for the second weld bead whereby, as explained hereinabove with regard to weld bead WB1, molten filler metal accumulates at the first end of the second welding bead to provide a corresponding cantilevered end CL therefor extending outwardly of edge 418 as shown in FIG. 21. Following the delay, the welding gun and electrode are moved, while being oscillated, back towards edge 416 and the first end of welding bead WB1 at a preselected rate of movement, whereby the latter movement together with the delay at the starting end of the bead provides for welding bead WB2 to be vertically thicker at its first end 52 than at its second end E2. As will be appreciated from FIGS. 17 and 18, as the successive weld beads progress vertically into the transition area, the welding gun will engage against shoes 122 and 124 whereby, as will be seen in FIG. 21, the second ends of the weld beads overlap laterally centrally of the gap. Such engagement occurs at the starting ends of the paths, and the delay in movement of the gun and electrode provides the spread of the molten metal as described hereinabove to provide the desired bead profile at the first end thereof and the cantilevered relationship with respect to the corresponding one of the gap edges 416 and 418. While not shown in FIG. 21, the entirety of the gap between the rail heads is filled by continuously sequentially moving the electrode in laterally opposite directions in the head gap and in the foregoing manner. As can be further appreciated from FIG. 21, the first ends of the weld beads in the transition area at each of the laterally opposite edges of the gap are cantilevered relative to the underlying first end, thereby optimizing support for the overlying bead and optimizing the strength of the filler weld along the laterally opposite sides of the rails in the transition area of the heads thereof. Likewise, the vertically successive first ends of the weld beads in the central and crown portions of the gap between the rail heads, as well as along the transition portions thereof, advantageously provide weld reinforcement at the laterally opposite edges of the rail and optimize the strength of the weld between the head portions.

Figure 22:
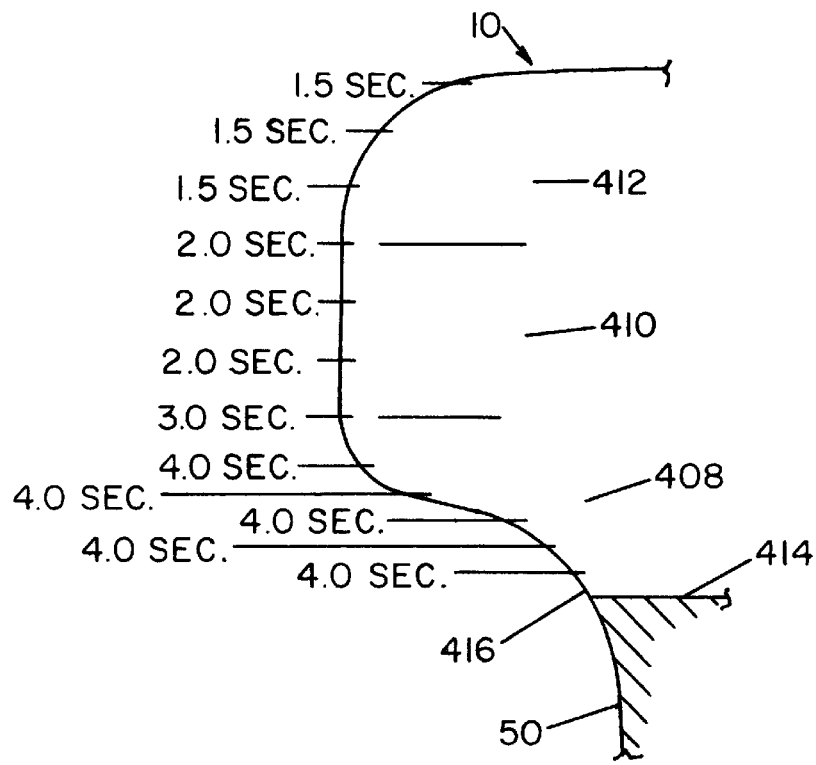
FIG. 22 is an enlarged schematic illustration of a rail head and illustrating the delay times with respect to the laying of beads of filler material between the head portions in accordance with this embodiment of the present invention; and, FIG. 23 is a schematic illustration of a railway rail indicating that almost all of the portions of the gap between rails to be joined are welded by pulsed welding in this embodiment of the present invention.

The time delay or hold time for the electrode at each of the opposite ends of the gap and thus at the first ends of successively laid welding beads can be from 1–10 seconds and, as set forth more fully hereinafter is preferably from 1.5 to 4.0 seconds in conjunction with preferred speeds of movement of the electrode along the bead laying paths and feed rates for the consumable welding electrode. Preferred delay times are depicted in FIG. 22 with respect to the transition, central and crown areas of the gap between the rails to be welded. With reference thereto, the delay time in connection with weld beads laid in the gap between the transition portions of the rails is 4.0 seconds up to the end of the transition portion as defined by a transition zone into the central portion of the rails and at which the hold time is preferably 3.0 seconds. The 4.0 seconds wait time allows the molten weld metal to fill the recess between the welding shoes and rail edges and to extend outwardly of the latter edge in cantilever fashion as shown and described hereinabove in connection with FIGS. 17–21. As the laying of weld beads extends vertically into the gap between the central portions of the rails, the delay time decreases to 2.0 seconds in that the heat generated by the preceding welding operation in the gap between the transition portions of the rails increasingly eases the fusion of the weld metal to the rail heads, whereby the delay time at the starting ends of the weld beads in the central portion can be reduced without sacrificing weld quality. For the same reason, the delay time for welding beads laid in the gap between the crown portions of the rails is reduced to 1.5 seconds. It will be appreciated, of course, that the depiction in FIG. 22 is with respect to the delay times at the first ends of the beads laid from left to right in FIG. 22 and for the first ends of the beads at the opposite edge of the gap, not shown, and which beads extend back toward the gap edge shown.

In addition to the foregoing preferred delay times with respect to filling the transition, central and crown portions of the gap between the rails, it is preferred, following the delay, to move the electrode laterally of the gap between the transition portions of the rail at a speed of 4 inches per minute and with a welding wire feed rate of 240 inches per minute. This speed and feed rate provide for controlling the weld bead shape in the transition area while maintaining good productivity and weld quality. In the gap between central portions 410 of the rail heads, the preferred welding speed is 5.5 inches per minutes with a feed rate of 240 inches per minute for the welding wire. The higher speed with respect to movement of the electrode in filling the gap between the central portions of the rail heads provides for filling the gap efficiently while controlling the welding cooling rate and the weld microstructure. With respect to filling the gap between the crown portions of the rail heads on which the railway car wheels ride, care is needed to maintain weld hardness and the highest possible weld quality. With the 1.5 second delay or wait time preferred as mentioned above, the weld beads in the gap between the crown portions of the rails are made with a reduced wire feeding rate of 210 inches per minute and an increased speed of movement of the welding electrode of 6 inches per minute. This feed rate and welding speed reduces the amount of welding heat being put into the weld in the crown area which, in turn, aids in maintaining adequate hardness levels in the rail head crowns.

Further in connection with preferred parameters for this embodiment of the present invention, bottom portion 404 of rail base 40 is preferably filled as mentioned hereinabove by spray welding and in conjunction with a barrier plate as described herein in connection with the embodiment of FIGS. 1–13. The direct, smooth, penetrating arc associated with spray gas metal arc welding advantageously provides for melting and fusing the bottom corners of the rail base to the barrier plate. The gap between top portions 406 of the rail bases is filled using the pulsed arc welding technique and, preferably, the welding electrode is laterally translated back and forth in the gap at a welding speed of 6 inches per minute and with a welding wire feed rate of 240 inches per minute which provides good productivity and weld bead shape control. As mentioned hereinabove, the gap between the web portions of the rails is contained by the copper shoes and, preferably, this gap is filled using a welding wire feed rate of 400 inches per minute. This feed rate facilitates filling the gap between the webs as quickly as possible and using the pulsed mode in accordance with this embodiment enables the quick filling of the gap without jeopardizing weld quality.

While considerable emphasis has been placed herein on the preferred embodiments and preferred parameters in connection therewith, it will be appreciated that many changes can be made in the disclosed embodiments without departing from the principles of the invention. Accordingly, it is to be distinctly understood that the foregoing descriptive matter is to be interpreted merely as illustrative of the invention and not as a limitation.

Having thus described the invention, the following is claimed:

1. A method of gas shielded arc welding steel railroad rails each having a lower base, a vertically extending web and an upper head, said rails having laterally extending end faces longitudinally spaced apart to provide a base gap, a web gap and a head gap to be filled with steel to join said rails, said method comprising the steps of filling said base gap, said web gap and said head gap with a molten steel from a filler metal electrode by a gas shielded electric arc process, said filling said head gap comprising continuously sequentially moving said electrode in laterally opposite directions in said head gap along paths having starting and ending ends in the corresponding one of said opposite directions for laying beads of filler metal along said paths, and delaying movement of said electrode from the starting end of each said path for a preselected period of time.

2. The method according to claim 1, wherein said period of time is from 1 to 10 seconds.

3. The method according to claim 1, and oscillating said electrode longitudinally of said head gap during movement of said electrode in said opposite directions.

4. The method according to claim 1, wherein said period of time is from 1.5 to 4.0 seconds.

5. The method according to claim 1, wherein said head gap includes a lower transition portion extending from said web gap, a central portion, and an upper crown portion, said period of time varying with respect to the beads of filler metal laid in the transition, central and crown portions of said head gap.

6. The method according to claim 5, wherein said period of time varies between 1.5 and 4.0 seconds.

7. The method according to claim 6, and oscillating said electrode longitudinally of said head gap during movement of said electrode in said opposite directions.

8. The method according to claim 5, wherein said period of time decreases with respect to the laying of beads in the direction from said transition portion toward said crown portion of said head gap.

9. The method according to claim 8, wherein said period of time decreases from 4.0 seconds to 1.5 seconds.

10. The method according to claim 8, wherein said period of time is 4.0 seconds for the beads laid in said transition portion, 2.0 seconds for the beads laid in said central portion, and 1.5 seconds for the beads laid in said crown portion.

11. The method according to claim 10, and oscillating said electrode longitudinally of said head gap during movement of said electrode in said opposite directions.

12. The method according to claim 10, wherein said transition portion and said central portion of said head gap include a zone of transition therebetween, and said period of time is 3.0 seconds for the beads laid in said transition zone.

13. The method according to claim 1, further including the step of moving said electrode in said opposite directions at a rate of speed from between about 4 inches per minute to about 6 inches per minute.

14. The method according to claim 1, wherein said head gap includes a lower transition portion extending from said web gap, a central portion, and an upper crown portion, and further including the step of moving said electrode in said opposite directions at a rate of speed varying with respect to the beads of filler metal laid in the transition, central and crown portions of said head gap.

15. The method according to claim 14, wherein said rate of speed varies between 4 inches per minute and 6 inches per minute.

16. The method according to claim 14, wherein said rate of speed increases with respect to the laying of beads in the direction from said transition portion to said crown portion of said head gap.

17. The method according to claim 16, wherein said rate of speed is 4 inches per minute for the beads laid in said transition portion, 5.5 inches per minute for the beads laid in said central portion, and 6 inches per minute for the beads laid in said crown portion.

18. The method according to claim 1, further including the step of vertically feeding said electrode at a feed rate varying from 210 to 240 inches per minute.

19. The method according to claim 1, wherein said head gap includes a lower transition portion extending from said web, a central portion, and an upper crown portion, and further including the step of vertically feeding said electrode at a feed rate varying with respect the beads of filler metal laid in the transition, central and crown portions of said head gap.

20. The method according to claim 19, wherein said feed rate varies between 210 inches per minute and 240 inches per minute.

21. The method according to claim 20, wherein said feed rate is 240 inches per minute for the beads laid in said transition portion and said central portion, and 210 inches per minute for the beads laid in said crown portion.

22. A method of gas shielded arc welding steel railroad rails each having a lower base, a vertically extending web and an upper head, said rails having laterally extending end faces longitudinally spaced apart to provide a base gap, a web gap and a head gap to be filled with steel to join said rails, each said gap having laterally opposite ends, said method comprising the steps of filling said base gap, said web gap and said head gap with a molten steel from a filler metal electrode by a gas shielded electric arc process, said filling said head gap including holding said electrode for a preselected period of time at a first location adjacent one of said laterally opposite ends of the head gap, moving the electrode at a preselected speed from the first location to a second location adjacent the other of said laterally opposite ends to lay a first bead of filler metal having a first end at said one of said opposite ends and a second end spaced from said one end in the direction toward the other of said opposite ends, said first bead having a vertical thickness which is greater at said first end thereof than at said second end thereof, holding said electrode at said second location for a preselected period of time and then moving the electrode at a preselected speed from said second location to a third location above and adjacent said first location to lay a second bead of filler metal having a first end at said other of said opposite ends and a second end spaced from said other end in the direction toward said one of said opposite ends, said second bead having a vertical thickness which is greater at said first end thereof than at said second end thereof, and repeating the steps of laying said first and second beads of filler metal until said head gap is filled.

23. The method according to claim 22, wherein said head gap includes a lower transition portion, a central portion and an upper crown portion, both said preselected period of time and said preselected speed varying with respect to the first and second beads laid in each of the transition, central and crown portions of said head gap.

24. The method according to claim 23, wherein said period of time decreases with respect to the laying of said beads in the direction from said transition portion toward said crown portion.

25. The method according to claim 24, wherein said period of time decreases from 4.0 seconds to 1.5 seconds.

26. The method according to claim 25, wherein said period of time is 4.0 seconds for the beads laid in said transition portion, 2.0 seconds for the beads laid in said central portion, and 1.5 seconds for the beads laid in said crown portion.

27. The method according to claim 26, wherein said transition portion and said central portion of said head gap include a zone of transition therebetween, and said period of time is 3.0 seconds for the beads laid in said transition zone.

28. The method according to claim 23, wherein said rate of speed increases with respect to the laying of beads in the direction from said transition portion to said crown portion.

29. The method according to claim 28, wherein said rate of speed increases from 4 inches per minute to 6 inches per minute.

30. The method according to claim 29, wherein said rate of speed is 4 inches per minute for the beads laid in said transition portion, 5.5 inches per minute for the beads laid in said central portion, and 6 inches per minute for the beads laid in said crown portion.

31. The method according to claim 23, wherein said period of time decreases with respect to the laying of beads in the direction from said transition portion toward said crown portion, and wherein said rate of speed increases with respect to the laying of beads in the direction from said transition portion to said crown portion.

32. The method according to claim 31, wherein said period of time is 4.0 seconds for the beads laid in said transition portion, 2.0 seconds for the beads laid in said central portion, and 1.5 seconds for the beads laid in said crown portion, and wherein said rate of speed is 4 inches per minute for the beads laid in said transition portion, 5.5 inches per minute for the beads laid in said central portion, and 6 inches per minute for the beads laid in said crown portion.

33. The method according to claim 32, further including the step of oscillating said electrode longitudinally of said head gap during said moving of said electrode between the first, second and third locations.

34. The method according to claim 23, further including the step of oscillating said electrode longitudinally of said head gap during said moving of said electrode between the first, second and third locations.

35. The method according to claim 22, further including the step of oscillating said electrode longitudinally of said head gap during said moving of said electrode between the first, second and third locations.

36. A method of gas shielded arc welding steel railroad rails each having a base, a vertically extending web and an upper head, said rails having laterally extending end faces longitudinally spaced apart to provide a base gap, a web gap and a head gap to be filled with molten steel from a filler metal electrode by a gas shielded electric arc process to join said rails, said base gap having a bottom portion and a top portion joining said web gap, said method comprising the steps of filling the bottom portion of said base gap with molten steel by a multi pass spray transfer arc welding process, filling the top portion of said base gap and said web gap with molten steel by a pulsed arc welding process, said filling of the top portion of said base gap and said web gap comprising moving said electrode in laterally opposite directions therein at a preselected speed, and then filling said head gap with molten steel by a pulsed arc welding process, said filling of said head gap comprising moving said electrode in laterally opposite directions therein along paths having starting and ending ends in the corresponding one of said opposite directions for laying beads of filler metal along said paths, and delaying movement of said electrode from the starting end of each said path for a preselected period of time.

37. The method according to claim 36, further including the step of longitudinally oscillating said electrode during the filling of the top portion of the base gap, the web gap and the head gap.

38. The method according to claim 36, further including the step of moving said electrode in said laterally opposite directions in the top portion of said base gap at a rate of speed of 6 inches per minute.

39. The method according to claim 36, wherein said head gap includes a lower transition portion extending from said web gap, a central portion, and an upper crown portion, said period of time varying with respect to the beads of filler metal laid in the transition, central and crown portions of said head gap.

40. The method according to claim 39, wherein said period of time varies between 1.5 and 4.0 seconds.

41. The method according to claim 40, wherein said period of time is 4.0 seconds for the beads laid in said transition portion, 2.0 seconds for the beads laid in said central portion, and 1.5 seconds for the beads laid in said crown portion.

42. The method according to claim 36, wherein said head gap includes a lower transition portion extending from said web gap, a central portion, and an upper crown portion, and further including the step of moving said electrode in said opposite directions at a rate of speed varying with respect to the beads of filler metal laid in the transition, central and crown portions of said head gap.

43. The method according to claim 42, wherein said rate of speed varies between 4 inches per minute and 6 inches per minute.

44. The method according to claim 43, wherein said rate of speed is 4 inches per minute for the beads laid in said transition portion, 5.5 inches per minute for the beads laid in said central portion, and 6 inches per minute for the beads laid in said crown portion.

45. The method according to claim 36, including the further step of feeding said electrode vertically at a preselected feed rate with respect to the filling of said top portion of said base gap, said web gap and said head gap.

46. The method according to claim 45, wherein said feed rate varies from 210 inches per minute to 400 inches per minute.

47. The method according to claim 46, wherein said head gap includes a lower transition portion, a central portion and a crown portion, and said feed rate is 240 inches per minute for the beads laid in said transition portion and said central portion and 210 inches per minute for the beads laid in said crown portion.

48. The method according to claim 46, wherein the feed rate is 240 inches per minute for filling said top portion of said base gap.

49. The method according to claim 46, wherein the feed rate is 400 inches per minute for filling said web gap.

50. The method according to claim 36, wherein said period of time is from 1 to 10 seconds, and further including the steps of moving said electrode in said opposite directions at a rate of speed between 4 and 6 inches per minute, and feeding said electrode vertically at a feed rate of from 210 inches per minute to 400 inches per minute with respect to filling the top portion of said base gap, said web gap and said head gap.

51. The method according to claim 50, wherein said head gap includes a lower transition portion, central portion and an upper crown portion, and wherein said period of time is 4.0 seconds for the beads laid in said transition portion, 2.0 seconds for the beads laid in said central portion, and 1.5 seconds for the beads laid in said crown portion.

52. The method according to claim 51, wherein said rate of speed is 4 inches per minute for the beads laid in said transition portion, 5.5 inches per minute for the beads laid in said central portion, and 6 inches per minute for the beads laid in said crown portion.

53. The method according to claim 52, wherein said feed rate is 240 inches per minute for the beads laid in said transition portion and said central portion and 210 inches per minute for the beads laid in said crown portion.

54. The method according to claim 53, wherein said rate of speed is 6 inches per minute with respect to the beads laid in the top portion of said base gap, and said feed rate is 240 inches per minute for filling said top portion of said base gap and 400 inches per minute for filling said web gap.

55. The method according to claim 54, further including the step of longitudinally oscillating said electrode during the filling of the top portion of the base gap, the web gap and the head gap.

* * * * *